(12) United States Patent
Takahashi et al.

(10) Patent No.: US 9,028,973 B2
(45) Date of Patent: May 12, 2015

(54) HIGH STRENGTH GALVANIZED STEEL SHEET HAVING EXCELLENT UNIFORM ELONGATION AND ZINC COATABILITY

(75) Inventors: Kenji Takahashi, Fukuyama (JP);
Kaneharu Okuda, Kawasaki (JP);
Yoshihiko Ono, Fukuyama (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 13/884,781

(22) PCT Filed: Nov. 10, 2011

(86) PCT No.: PCT/JP2011/076467
§ 371 (c)(1),
(2), (4) Date: Jul. 29, 2013

(87) PCT Pub. No.: WO2012/063969
PCT Pub. Date: May 18, 2012

(65) Prior Publication Data
US 2013/0295410 A1 Nov. 7, 2013

(30) Foreign Application Priority Data

Nov. 12, 2010 (JP) ................................. 2010-253803
Nov. 1, 2011 (JP) ................................. 2011-240118

(51) Int. Cl.
*B32B 15/04* (2006.01)
*B32B 15/18* (2006.01)
(Continued)

(52) U.S. Cl.
CPC ......... *C22C 38/00* (2013.01); *Y10T 428/12799* (2015.01); *Y10T 428/12972* (2015.01);
(Continued)

(58) Field of Classification Search
CPC .... B32B 15/01; B32B 15/013; B32B 15/043; B32B 15/18; C23C 2/00; C23C 2/02; C23C 2/06; C23C 2/28; C23C 30/00; C23C 30/005; C22C 38/00; C22C 38/001; C22C 38/02; C22C 38/04; C22C 38/06; C22C 38/005; C22C 38/08; C22C 38/12; C22C 38/14; C22C 38/16; C22C 38/18; Y10T 428/12799; Y10T 428/12972
USPC ................................... 428/659, 684
See application file for complete search history.

(56) References Cited

U.S. PATENT DOCUMENTS

2009/0014098 A1 * 1/2009 Matsuda et al. ............. 148/503

FOREIGN PATENT DOCUMENTS

JP 2005-255799 10/1993
JP H07207413 A 8/1995
(Continued)

OTHER PUBLICATIONS

Machine Translation, Kizu et al., JP 2007-092132, Apr. 2007.*
(Continued)

*Primary Examiner* — Michael E La Villa
(74) *Attorney, Agent, or Firm* — RatnerPrestia

(57) ABSTRACT

A high strength galvanized steel sheet is provided comprising steel containing C: 0.06% or more and 0.20% or less, Si: less than 0.50%, Mn: 0.5% or more and less than 2.0%, P: 0.05% or less, S: 0.02% or less, Al: 0.60% or more and 2.00% or less, N: less than 0.004%, Cr: 0.10% or more and 0.40% or less and B: 0.003% or less, satisfying the relationships $0.8 \leq Mn_{eq} \leq 2.0$ and $Mn_{eq}+1.3[\%Al] \geq 2.8$, and a microstructure containing a ferrite phase and a second phase whose volume fraction is 15% or less, the second phase having a martensite phase whose volume fraction is 3% or more, a retained austenite phase whose volume fraction is 3% or more and a sum of the volume fractions of a pearlite phase and a bainite phase being equal to or less than the volume fraction of the martensite phase and the volume fraction of the retained austenite phase.

4 Claims, 7 Drawing Sheets

(51) Int. Cl.
    *C22C 38/00* (2006.01)
    *C23C 2/02* (2006.01)
    *B32B 15/01* (2006.01)
    *C23C 30/00* (2006.01)
    *C21D 8/02* (2006.01)
    *C22C 38/02* (2006.01)
    *C22C 38/04* (2006.01)
    *C22C 38/06* (2006.01)
    *C22C 38/18* (2006.01)
    *C23C 2/06* (2006.01)
    *C23C 2/28* (2006.01)
    *C21D 9/46* (2006.01)
    *C21D 9/52* (2006.01)

(52) U.S. Cl.
    CPC ............... *B32B15/013* (2013.01); *B32B 15/18* (2013.01); *C23C 30/005* (2013.01); *C21D 8/0226* (2013.01); *C21D 9/46* (2013.01); *C21D 2211/001* (2013.01); *C21D 2211/005* (2013.01); *C21D 2211/008* (2013.01); *C22C 38/001* (2013.01); *C22C 38/02* (2013.01); *C22C 38/04* (2013.01); *C22C 38/06* (2013.01); *C22C 38/18* (2013.01); *C23C 2/06* (2013.01); *C21D 8/0236* (2013.01); *C23C 2/02* (2013.01); *C23C 2/28* (2013.01)

(56) References Cited

FOREIGN PATENT DOCUMENTS

| | | |
|---|---|---|
| JP | 2000-256789 A | 9/2000 |
| JP | 2001-355041 A | 12/2001 |
| JP | 2004-149921 A | 5/2004 |
| JP | 2004-256836 A | 9/2004 |
| JP | 2005-171319 A | 6/2005 |
| JP | 2007/092132 A | 4/2007 |
| JP | 2007-262553 A | 10/2007 |
| JP | 2007-321233 A | 12/2007 |
| JP | 2010-156031 A | 7/2010 |

OTHER PUBLICATIONS

International Search Report dated Feb. 21, 2012, application No. PCT/JP2011/076467.

* cited by examiner $V_\gamma$ : VOLUME FRACTION OF RETAINED AUSTENITE PHASE
$V_{P, B}$ : SUM OF VOLUME FRACTIONS OF PEARLITE AND BAINITE PHASES $V_M$ : VOLUME FRACTION OF MARTENSITE PHASE
$V_{P,B}$ : SUM OF VOLUME FRACTIONS OF PEARLITE AND BAINITE PHASES ize the collision safety of a vehicle is also required from the viewpoint of occupant protection in a collision of vehicles. An increase in the strength and a decrease in the thickness of car body parts are being realized by the application of a high strength steel sheet to the parts in order to achieve both a decrease in the weight and an increase in the collision safety of a car body at the same time, as described above.

HIGH STRENGTH GALVANIZED STEEL SHEET HAVING EXCELLENT UNIFORM ELONGATION AND ZINC COATABILITY

CROSS REFERENCE TO RELATED APPLICATIONS

This application is the U.S. National Phase application of PCT International Application No. PCT/JP2011/076467, filed Nov. 10, 2011, and claims priority to Japanese Patent Application No. 2010-253803, filed Nov. 12, 2010, and Japanese Application No. 2011-240118, filed Nov. 1, 2011, the disclosures of each application being incorporated herein by reference in their entireties for all purposes.

FIELD OF THE INVENTION

The present invention relates to a high strength galvanized steel sheet having excellent uniform elongation and zinc coatability that can be applied to a press-formed part of an automobile body and a domestic electric appliance of which high formability and zinc coatability are required and that has a tensile strength of 440 MPa or more and less than 590 MPa and a method for manufacturing the steel sheet.

BACKGROUND OF THE INVENTION

Nowadays, it is strongly required to reduce the weight of a car body from the viewpoint of improving fuel efficiency of an automobile. In addition to that, increasing the collision safety of a vehicle is also required from the viewpoint of occupant protection in a collision of vehicles. An increase in the strength and a decrease in the thickness of car body parts are being realized by the application of a high strength steel sheet to the parts in order to achieve both a decrease in the weight and an increase in the collision safety of a car body at the same time, as described above.

However, since strengthening of a steel sheet is accompanied by a decrease in press formability in terms of, for example, ductility or deep drawability, it is difficult to apply a high strength steel sheet to press-formed parts for which a high formability is required. For example, a steel sheet having a low tensile strength of from 270 MPa to 340 MPa and excellent formability has been used for automobile outer panels such as a door outer panel and a back door panel. It is necessary to maintain high formability in order to increase the strength of these parts. Total elongation observed in a tensile test is used as one of the indicators of formability. The larger the total elongation which is the sum of uniform elongation and local elongation, the more intensive the work to which a workpiece can be subjected until the workpiece is broken. However, in the case where the deformation of a steel sheet becomes larger than uniform elongation and reaches the range of local elongation in a practical press forming process, the deformation is concentrated at a portion at which local elongation occurs, which results in necking in which a decrease in thickness is concentrated at the portion. Therefore, the portion at which necking occurs can be easily broken and raises the danger of fracture in a press forming process. Moreover, there is the deterioration of the surface appearance of an outer panel in the case where necking occurs at the design surface of the panel. For these reasons, high uniform elongation is required of a steel sheet to be used for an outer panel. In addition, up to now, it has been also strongly required to suppress the occurrence of yield point elongation of this kind of steel sheet in order to prevent the deterioration of surface appearance quality due to the occurrence of stretcher strain.

At the same time, the application of a galvanized steel sheet to car body parts is being developed, because it is important to secure the corrosion resistance of car body parts from the viewpoint of prolonging the service life of car bodies. Therefore, zinc coatability also has become one of the important requirements of a high strength steel sheet.

A Dual-Phase (DP) steel sheet, in which a hard martensite phase is dispersed in a soft ferrite phase, is well known as one of the approaches to increase the tensile strength and ductility of a steel sheet at the same time. A DP steel sheet is excellent in terms of shape fixability due to having a low yield point as well as a high strength, and, moreover, exhibits comparatively high uniform elongation due to having an excellent work hardening property (refer to, for example, Patent Literature 1). However, it is difficult to say that a DP steel sheet has sufficient formability equivalent to that of a kind of steel sheet having strength of from 270 MPa to 340 MPa.

Therefore, a TRIP steel sheet, which utilizes a transformation-induced plasticity (Transformation-induced Plasticity: TRIP) effect which exhibits high ductility, in particular, high uniform elongation by having formed a retained austenite phase in a soft ferrite phase and by using the transformation of the austenite phase into a martensite phase when deformation occurs, is well known as an approach to achieve better ductility. Among TRIP steel sheets, a Si added TRIP steel sheet, in which the formation of carbides is delayed by adding Si, then concentration of C in an austenite phase is promoted and an austenite phase is stabilized, is well known (refer to, for example, Patent Literature 2). However, although a Si added TRIP steel sheet has an excellent balance of TS×EL, the steel sheet has low ductility and a small absolute value of uniform elongation, because the steel sheet inevitably has a tensile strength of 590 MPa or more when the steel sheet contains an enough amount of Si to secure the retained austenite phase, since Si is a chemical element which has a very strong effect of solid-solution strengthening. In fact, a conventional cold-rolled Si added TRIP steel sheet has a uniform elongation of less than 24%. Moreover, Si tends to form a strong oxidized film on the surface of a steel sheet in the processes of slab heating, hot rolling and annealing, which results in the occurrence of surface defects such as residual scale, uneven plating and bare spots. Therefore, a Si added TRIP steel sheet needs improvement from the viewpoint of surface appearance quality also.

Therefore, an Al added TRIP steel sheet is proposed, since Al promotes concentration of C in an austenite phase as Si does, and compared with Si, Al has a smaller effect of increasing strength and decreasing zinc coatability. For example, Patent Literature 3 discloses a method for manufacturing a steel sheet having excellent ductility and adhesion of coating, which has a certain amount of retained austenite phase produced by reducing a content of Si and keeping an Al content of from 1.5% to 2%, with a tensile strength (TS) of from 440 MPa to 490 MPa and a elongation (El) of from 36% to 39%. However, in order to produce this steel sheet, it is essential to distribute Mn beforehand by performing annealing under conditions for a dual phase, that is, at a temperature of 800° C. for a duration of about one hour prior to final annealing, and, moreover, in a process of annealing and plating, it is necessary that the steel sheet be cooled after undergoing soaking annealing of 800° C.×60 seconds and undergo annealing of a long duration of 10 minutes or less after undergoing dipping in a plating bath at a temperature of 440° C. That is to say, in this method, it is difficult to manufacture the steel sheet in a common CGL line which does not have an annealing line following a hot-dip plating line, and, moreover, there is a problem of a large increase in production cost, because it is necessary to perform a heat treatment prior to final annealing. Moreover, as described in the examples, since any of the preferred steel sheets according to the above inventions have yield point elongation of more than 2%, there is the deterioration of surface appearance quality due to the occurrence of stretcher strain when press forming is performed.

Although Patent Literature 4 also discloses a method for manufacturing galvanized steel sheet having high ductility in which a retained austenite phase is utilized effectively by decreasing a Si content and by adding Al, there is necessity of annealing at a temperature of 750° C. or more before final annealing in a CGL and tempering at a temperature of from 250° C. to 550° C.

Patent Literature 5 proposes a method for manufacturing a galvanized steel sheet which utilizes a cold-rolled steel sheet as a base metal containing Si and high contents of Mn and Al, having a tensile strength of from 440 MPa to 490 MPa and excellent ductility. However, there is a problem from the viewpoint of surface appearance quality in that the powdering property of the plating of the steel sheet disclosed in this literature is significantly poor, because the alloying temperature of the steel sheet is much higher than that in existing methods. In addition, since rapid heating is necessary, there is a significant increase in manufacturing cost in comparison to conventional CGL equipment.

Patent Literature 6 proposes a method for manufacturing a high Al containing steel sheet having an excellent TS×EL balance, other than the method in which steel having a high content of Al undergoes a heat treatment in advance of plating in a CGL, in which plating in a CGL is performed after forming a hot-rolled microstructure containing the volume fraction of a low-temperature transformation phase of 10% or more which contains the volume fraction of a bainite phase of 80% or more by coiling a hot-rolled steel sheet at a low temperature of from 350° C. to 500° C., without performing the heat treatment in advance of plating in a CGL. However, it is difficult to say that a sufficiently good zinc coatability can be achieved by using this method, because a chemical composition containing a certain amount of Si is adopted.

Patent Literature 7 discloses a method for manufacturing a high Al containing steel sheet exhibiting high EL. However, cooling ability in terms of a secondary cooling rate of 80° C./s or more is substantially essential for this method for manufacturing a steel sheet. Incidentally, the present inventors conducted investigations in a range of low cooling rate and found that the properties of some of the steel sheets according to the examples of the literature became significantly poor, because the second phase degraded into a pearlite phase.

PATENT LITERATURE

[PTL 1] Japanese Patent No. 4207738
[PTL 2] Japanese Unexamined Patent Application Publication No. 5-255799
[PTL 3] Japanese Unexamined Patent Application Publication No. 2001-355041
[PTL 4] Japanese Patent No. 4333352
[PTL 5] Japanese Unexamined Patent Application Publication No. 2000-256789
[PTL 6] Japanese Unexamined Patent Application Publication No. 2004-256836
[PTL 7] Japanese Patent No. 3569307

SUMMARY OF THE INVENTION

As described above, it is difficult to say that a high strength galvanized steel sheet having strength of from 440 MPa to 590 MPa, high uniform elongation and excellent zinc coatability which can be manufactured without a significant increase in manufacturing cost or alloy cost and a method for manufacturing the steel sheet have been provided.

Therefore, the present invention provides a high strength galvanized steel sheet having strength of 440 MPa or more and less than 590 MPa, excellent uniform elongation from the viewpoint of formability, suppressed yield point elongation from the viewpoint of quality of an outer panel and excellent zinc coatability, and a method for manufacturing the steel sheet.

Up to now, steel containing a large amount of Si and Mn has been investigated in order to achieve a large amount of retained austenite phase for the purpose of achieving high ductility, which results in a decrease in uniform elongation and zinc coatability of a steel sheet. In order to solve the problems described above, the present inventors diligently conducted investigations on chemical compositions without adding a large amount of alloy elements such as Si from the viewpoint of achieving excellent quality of an outer panel, and, as a result, found that it is important to disperse a small amount of metastable retained austenite phase in a microstructure while keeping a tensile strength less than 590 MPa by keeping a large volume fraction of ferrite phase, in order to achieve more excellent uniform elongation (U.El) than that of conventional TRIP steel.

Moreover, the present inventors found that it is appropriate to form a compound microstructure in which a small amount of hard martensite phase is dispersed in order to suppress the occurrence of yield point elongation (YPEl) of steel, that it is important therefor to design an alloy composition which are not disclosed in the conventional methods and to set manufacturing conditions appropriate for the designed alloy composition and that it is necessary to control the contents of Mn, Cr, P, B and Al to appropriate ranges and to adjust annealing conditions in the final annealing in accordance with the alloy composition.

Specific methods will be described in the following items (1) through (3).

(1) The amount of Si is set to be as small as possible and an appropriate amount of Al is added from the viewpoint of surface appearance.

(2) It was found that it is necessary to design an alloy composition in which solid-solution strengthening of a ferrite phase is suppressed in order to achieve low strength satisfying the relationship TS<590 MPa and to set the volume fraction of the second phase to be 15% or less in order to achieve the enough volume fraction of such a soft ferrite phase. Therefore, the content of Si which is a chemical element that is strongly effective for solid-solution strengthening is set to be as small as possible. Moreover, the $Ae_3$ line in a Fe—C equilibrium diagram is to be shifted to the side of high carbon by adding Al and by reducing a Mn content and ferrite transformation is to be promoted by specifying the upper limit of contents of chemical elements to be used for quenching such as Mn, Cr, P and B through use of a Mn equivalent equation. A polygonal ferrite phase tends to be formed during annealing or a primary cooling step in this kind of steel, which results in a decrease in the amount of formation of bainitic ferrite phase which is comparatively hard and results in achieving low strength and high ductility.

(3) It is necessary to avoid as far as possible the formation of phases such as pearlite and bainite phases which are accompanied by formation of carbides by distributing appropriate volume fractions of metastable retained austenite phase and hard martensite phase in the soft ferrite phase described above in order to achieve high uniform elongation of 24% or more and suppress the occurrence of YPE1. It is essential therefor to promote ferrite transformation and to suppress the formation of a pearlite phase when primary cooling is performed after annealing, and, moreover, to appropriately suppress the formation of a bainite phase when intermediate holding is performed before dipping into a plating bath. It is appropriate to control the contents of chemical elements which are effective for hardening such as Mn, Cr, P and B and the cooling conditions through use of an equation in relation to a Mn equivalent described below in order to promote the formation of a ferrite phase and in order to suppress the formation of a pearlite phase and, similarly, to appropriately control manufacturing conditions in accordance with an relational expression among Mn, P, B, Cr and Al in order to suppress the formation of a bainite phase.

It is necessary not only that the amount of Si be reduced as far as possible and Al is added but also that the volume fraction of the second phase be controlled to be a certain value or less in order to improve uniform elongation by decreasing strength and to improve zinc coatability. Although this makes it significantly difficult to achieve the volume fractions of austenite and martensite phases and stability of a retained austenite phase, the stability of an untransformed austenite phase can be appropriately controlled and the formation of a pearlite phase can be delayed while ferrite transformation proceeds when cooling is performed after annealing by setting a Mn equivalent to be 0.8% or more and 2.0% or less. However, this is not sufficient in order to suppress the formation of a bainite phase in a temperature range for bainite transformation, but a stable austenite phase can be achieved by further adding Al in balance with a Mn equivalent. Here, a small amount of martensite phase can be appropriately achieved by adding Cr with a content of 0.10% or more and 0.40% or less.

Although the reason why Cr contributes to achieving the volume fraction of a martensite phase is not necessarily clear, it is considered to be because, as described below, Cr is effective for suppressing the formation of a bainitic ferrite phase from an austenite phase and for preventing all of the austenite phase from becoming a retained austenite phase. This is considered to be because Cr delays the diffusion of C in an austenite phase and suppresses the growth of a bainitic ferrite by impeding the formation of carbide ($Fe_3C$), since Cr is a chemical element which is effective for stabilizing an austenite phase and has a high affinity for carbon. Therefore, Cr is a very effective chemical element in the present invention.

The present invention has been completed on the basis of the knowledge described above and provides the following items (1) through (5).

(1) A high strength galvanized steel sheet having excellent uniform elongation and zinc coatability, which comprises steel having a chemical composition containing, by mass %, C: 0.06% or more and 0.20% or less, Si: less than 0.50%, Mn: 0.5% or more and less than 2.0%, P: 0.05% or less, S: 0.02% or less, Al: 0.60% or more and 2.00% or less, N: less than 0.004%, Cr: 0.10% or more and 0.40% or less, B: 0.003% or less (including 0%) and the balance being Fe and inevitable impurities, where $Mn_{eq}$ defined below satisfies the relationships $0.8 \leq Mn_{eq} \leq 2.0$ and $Mn_{eq}+1.3[\% Al] \geq 2.8$, and having a microstructure containing a ferrite phase as a parent phase and a second phase whose volume fraction is 15% or less, the second phase having a martensite phase whose volume fraction is 3% or more, a retained austenite phase whose volume fraction is 3% or more and a sum of the volume fractions of a pearlite phase and a bainite phase which is equal to or less than the volume fraction of the martensite phase and the volume fraction of the retained austenite phase, and a galvanizing layer on the surface of the steel sheet, the steel sheet having a tensile strength of 440 MPa or more and less than 590 MPa and a uniform elongation of 24% or more:

$$Mn_{eq}=[\% Mn]+1.3[\% Cr]+4[\% P]+150[\% B],$$

where [% Mn], [% Cr], [% P] and [% B] respectively denote the contents by mass % of Mn, Cr, P and B in the chemical composition of the steel.

In addition, [% Al] described above also denotes the content by mass % of Al in the chemical composition of the steel.

(2) The high strength galvanized steel sheet having excellent uniform elongation and zinc coatability according to item (1), the Si content of the steel being less than 0.05%.

(3) The high strength galvanized steel sheet having excellent uniform elongation and zinc coatability according to item (1) or (2), the steel having a chemical composition further containing, by mass %, one or more of Ti: 0.02% or less, V: 0.02% or less, Ni: 0.2% or less, Cu: less than 0.1%, Nb: 0.02% or less, Mo: less than 0.1%, Sn: 0.2% or less, Sb: 0.2% or less and Ca and REM: 0.01% or less.

(4) The high strength galvanized steel sheet having excellent uniform elongation and zinc coatability according to any one of items (1) to (3), the steel sheet having a tensile strength×elongation balance of 19000 MPa·% or more and a tensile strength×uniform elongation of 12000 MPa·% or more.

(5) A method for manufacturing a high strength galvanized steel sheet having excellent uniform elongation and zinc coatability, the method including heating a steel slab having the chemical composition according to any one of items (1) to (3) up to a temperature of 1100° C. or higher and 1250° C. or lower, then hot-rolling the slab, coiling the hot-rolled steel sheet at a coiling temperature of higher than 500° C., then pickling the steel sheet, then cold-rolling the steel sheet, then heating the cold-rolled steel sheet up to a temperature of 750° C. or higher and 950° C. or lower, then holding the temperature for a duration of 20 seconds or more and 200 seconds or less, then subjecting the steel sheet to a primary cooling at a mean cooling rate of 5° C./s or more and 40° C./s or less down to a stopping temperature of primary cooling equal to or higher than a critical primary cooling temperature $T_{crit}$ defined by the equation below, then further subjecting the steel sheet to a secondary cooling at a mean cooling rate of 15° C./s or more down to a temperature in a range of an intermediate holding temperature of 410° C. or higher and 500° C. or lower, then holding the temperature in the range for a duration of 10 seconds or more and 180 seconds or less, then galvanizing the steel sheet by dipping the steel sheet in a galvanizing bath, and, optionally, then further performing an alloying treatment on the galvanizing layer.

$$T_{crit}=870-2.5(66 \times Mn_{eq}+CR),$$

where $Mn_{eq}=[\% Mn]+1.3[\% Cr]+4[\% P]+150[\% B]$, where [% Mn], [% Cr], [% P] and [% B] respectively denote the contents by mass % of Mn, Cr, P and B in the chemical composition of the steel. In addition, CR denotes a mean cooling rate (° C./s) for primary cooling.

According to the present invention, a high strength galvanized steel sheet having strength of 440 MPa or more and less than 590 MPa, uniform elongation of 24% or more and excellent zinc coatability and a method for manufacturing a high strength galvanized steel sheet in which such steel sheet can be manufactured without utilizing complex processes or an increase in cost can be obtained. Moreover, the steel sheet according to the present invention preferably has a high tensile strength×elongation (TS×El) balance and a high tensile strength×uniform elongation (TS×U.El) balance, suppressed occurrence of yield point elongation (YPEl), and excellent formability and surface quality.

DETAILED DESCRIPTION OF EMBODIMENTS OF THE INVENTION

Figure 1:
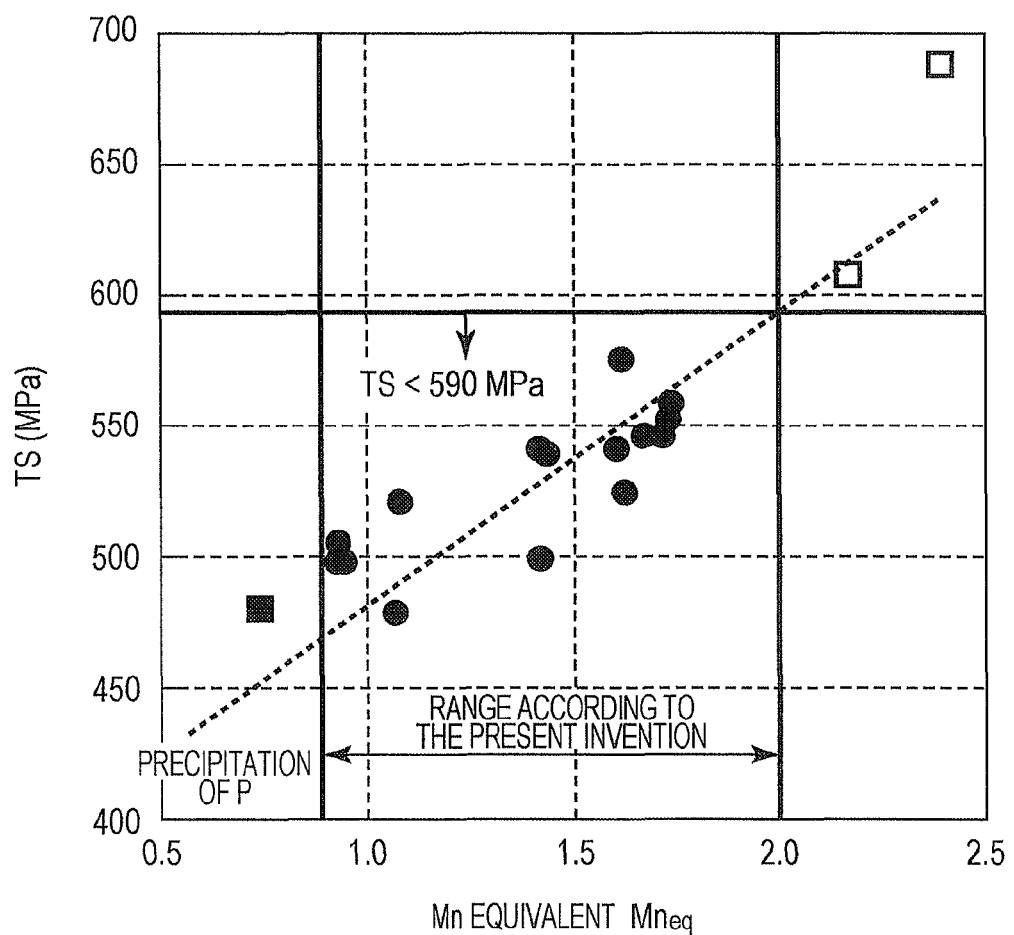
FIG. 1 is a diagram illustrating the investigation results regarding the relationship between a Mn equivalent and a TS of steel and regarding whether or not a pearlite phase was formed when continuous cooling was performed.

The present invention will be described in detail regarding "chemical composition", "microstructure" and "manufacturing method" hereafter.

[Chemical Composition]

Firstly, the reason for the limitations on each component of the chemical composition according to the present invention will be described. The "%" sign concerning composition refers to "% by mass" unless otherwise indicated.

C: 0.06% or More and 0.20% or Less

C is a chemical element which is inexpensive and significantly effective for stabilizing an austenite phase and very important for retaining an austenite phase. C is transferred from a ferrite phase to an austenite phase during annealing under conditions for a duplex phase and along with the ferrite transformation in heat treatment processes described below and stabilizes an austenite phase to retain an austenite phase at room temperature. An austenite phase of 3% or more having such concentrated C is necessary in order to increase uniform elongation. In the case where a C content is less than 0.06%, uniform elongation cannot be sufficiently increased, because the amount of a retained austenite phase becomes less than 3%, or because the retained austenite phase is unstable due to insufficient concentration of C even if the amount of the retained austenite phase of 3% or more is achieved. Although, the higher the C content is, the larger the amount and the higher the stability of a retained austenite phase are, in the case where the C content is more than 0.20%, the volume fraction of the second phase become too large, which results in a further deterioration of weldability. Therefore, the C content is set to be 0.06% or more and 0.20% or less, preferably 0.07% or more and less than 0.15% in order to achieve a steel sheet having high ductility.

Mn: 0.5% or More and Less than 2.0%

Mn is a chemical element which is important for suppressing the transformation of an austenite phase into a pearlite or bainite phase. In the case where the Mn content is less than 0.5%, it is very difficult to retain an austenite phase at room temperature, because an austenite phase tends to be degraded into a pearlite or bainite phase when cooling is performed after annealing. On the other hand, in the case where the Mn content is 2.0% or more, there is an increase in the second phase and the tensile strength becomes 590 MPa or more, which results in a decrease in ductility. Therefore, the Mn content is set to be 0.5% or more and less than 2.0%, preferably less than 1.7%, more preferably less than 1.6%.

Si: Less than 0.50%

Si is a chemical element which is significantly effective for promoting the concentration of C in an austenite phase, because Si suppresses the precipitation of cementite from an austenite phase. However, the large content of Si causes an increase in tensile strength, because Si has very high ability of solid-solution strengthening. In addition, since Si has a high affinity for oxygen and tends to cause the formation of an oxide film on the surface of a steel sheet, even a small amount of Si causes residual scale when hot rolling is performed and bare spots due to formation of an oxide film when continuous galvanizing is performed. Therefore, it is desirable that the Si content be as small as possible, and the Si content is set to be less than 0.50%, preferably less than 0.20% from the viewpoint of improving surface appearance quality, more preferably less than 0.05%. It is preferable that the Si content be less than 0.03% in order to achieve particularly excellent surface appearance quality.

Al: 0.60% or More and 2.00% or Less

Al is a chemical element which is essential for increasing carbon concentration in an austenite phase, because Al suppresses the precipitation of carbides from an austenite phase. Moreover, since Al is a chemical element which is significantly effective for stabilizing a ferrite phase, the $Ae_3$ line is shifted to the side of higher carbon and C concentration in an austenite phase existing together with a ferrite phase is increased. Thus, there is a further increase in the stability of a retained austenite phase. In the case where the Al content is less than 0.60%, a sufficient effect of suppressing the formation of carbide cannot be achieved. On the other hand, in the case where the Al content is more than 2.00%, an oxidized film is formed on the surface of a steel sheet, which results in a significant decrease in surface appearance quality. Moreover, since Al forms AlN in combination with N and AlN forms inclusions, there is a decrease in casting performance. In addition, since a large ferrite band microstructure tends to be formed, the microstructure becomes non-uniform, which results in a decrease in material quality. Therefore, the Al content is set to be 0.60% or more and 2.00% or less, preferably 0.70% or more in order to increase the effect of Al. In addition, it is preferable that the Al content be 1.80% or less in order to more certainly avoid the inconvenience described above.

$0.85 \leq Mn_{eq} \leq 2.0$

In order to achieve a stable austenite phase at room temperature, at first, the formation of a pearlite phase should be suppressed when continuous cooling is performed after annealing under conditions for a dual phase. Therefore, a Mn equivalent ($Mn_{eq}$) is an item which should be strictly controlled in the present invention.

From the investigation results regarding the influence of various chemical elements on the formation of pearlite when continuous cooling is performed after annealing under conditions for a dual phase, it was found that Mn, Cr, P and B have an effect of delaying the formation of a pearlite phase and the effect can be expressed through use of a Mn equivalent equation as follows.

$$Mn_{eq}=[\%\ Mn]+1.3[\%\ Cr]+4[\%\ P]+150[\%\ B],$$

where [% Mn], [% Cr], [% P] and [% B] respectively denote the contents by mass % of Mn, Cr, P and B in the chemical composition of the steel sheet.

Moreover, since a Mn equivalent has an effect of delaying the formation of a ferrite phase also and a large influence on the volume fraction of the second phase, a Mn equivalent is an important factor which almost entirely determines a tensile strength (TS) of the steel according to the present invention.

FIG. 1 illustrates the investigation results regarding the relationship between a Mn equivalent and a TS of steel having a chemical composition containing C: 0.11%, Si: 0.01%, Mn: from 0.5% to 1.7%, P: 0.01%, S: 0.002%, Al: 1.50%, Cr: 0.3%, N: 0.002% and B: from 0 to 0.001% and regarding whether or not a pearlite phase was formed when continuous cooling was performed. In the figure, ● denotes a steel sheet having a uniform elongation of 24% or more, ■ denotes a steel sheet having a pearlite phase and a uniform elongation of less than 24% and □ denotes a steel sheet having a uniform elongation of less than 24% despite having no pearlite phase.

The method for preparing a test piece will be described hereafter. A slab having the chemical composition described above and a thickness of 27 mm was heated up to a temperature of 1200° C., then the slab was hot-rolled with a finishing temperature of 950° C. down to a thickness of 4 mm, then the hot-rolled steel sheet was immediately cooled with water spray and then the steel sheet was subjected to a coiling treatment at a temperature of 580° C. for a duration of one hour. This hot-rolled steel sheet was cold-rolled with a rolling ratio of 80% into a cold-rolled steel sheet having a thickness of 0.80 mm. This cold-rolled steel sheet was annealed under conditions for a dual phase, that is, at a temperature of 850° C. for a duration of 120 seconds, then cooled at a mean cooling rate of 15° C./s down to an appropriate stopping temperature range of primary cooling which is determined in accordance with a Mn equivalent as described below, then cooled at a mean cooling rate of 25° C./s down to a temperature of 470° C., then immediately held at the constant temperature for a duration of 40 seconds, then dipped in a galvanizing bath at a temperature of 460° C., then held at a temperature of 510° C. for a duration of 20 seconds for an alloying treatment, then cooled at a mean cooling rate of 20° C./s down to a temperature range of 200° C. or lower, then cooled at a mean cooling rate of 10° C./s down to room temperature and then subjected to skin pass rolling with an elongation ratio of 0.5%.

A tensile test was carried out in the method conforming to JIS Z 2241 with a JIS No. 5 tensile test piece cut out of the steel sheet obtained as described above. In addition, it was confirmed whether or not there is a pearlite or bainite phase by observing the microstructure of the steel sheet by using a scanning electron microscope at a magnification of 3000 times.

FIG. 1 indicates that a TS varies in proportion to a Mn equivalent ($Mn_{eq}$) and that it is necessary to set $Mn_{eq}$ to be 2.0 or less in order to achieve a low strength of TS<590 MPa by promoting the ferrite transformation of a steel sheet. Although, the less the $Mn_{eq}$, the more the volume fraction of a ferrite phase and the lower the strength of the steel sheet, pearlite transformation cannot be suppressed in the case where $Mn_{eq}$ is less than 0.8. Therefore, the range of $Mn_{eq}$ is set to be $0.8 \leq Mn_{eq} \leq 2.0$ from the viewpoint of realizing the effect of $Mn_{eq}$ of delaying the formation of pearlite when cooling is performed while satisfying the relationship TS<590 MPa. It is preferable that $Mn_{eq}$ be 1.9 or less from the viewpoint of achieving further low strength.

$$Mn_{eq}+1.3[\%\ Al] \geq 2.8$$

The influence of alloy elements on transformation behavior at a holding temperature before dipping in a plating bath is performed was investigated in order to achieving a retained austenite phase by suppressing the formation of pearlite and bainite phases at such a holding temperature, and, from the investigation results, it was found that Al also have a large effect of suppressing the formation as well as a Mn equivalent described above. Therefore, the influence of a Mn equivalent and an Al content on the uniform elongation of a steel sheet after annealing has been performed was investigated.

Figure 2:
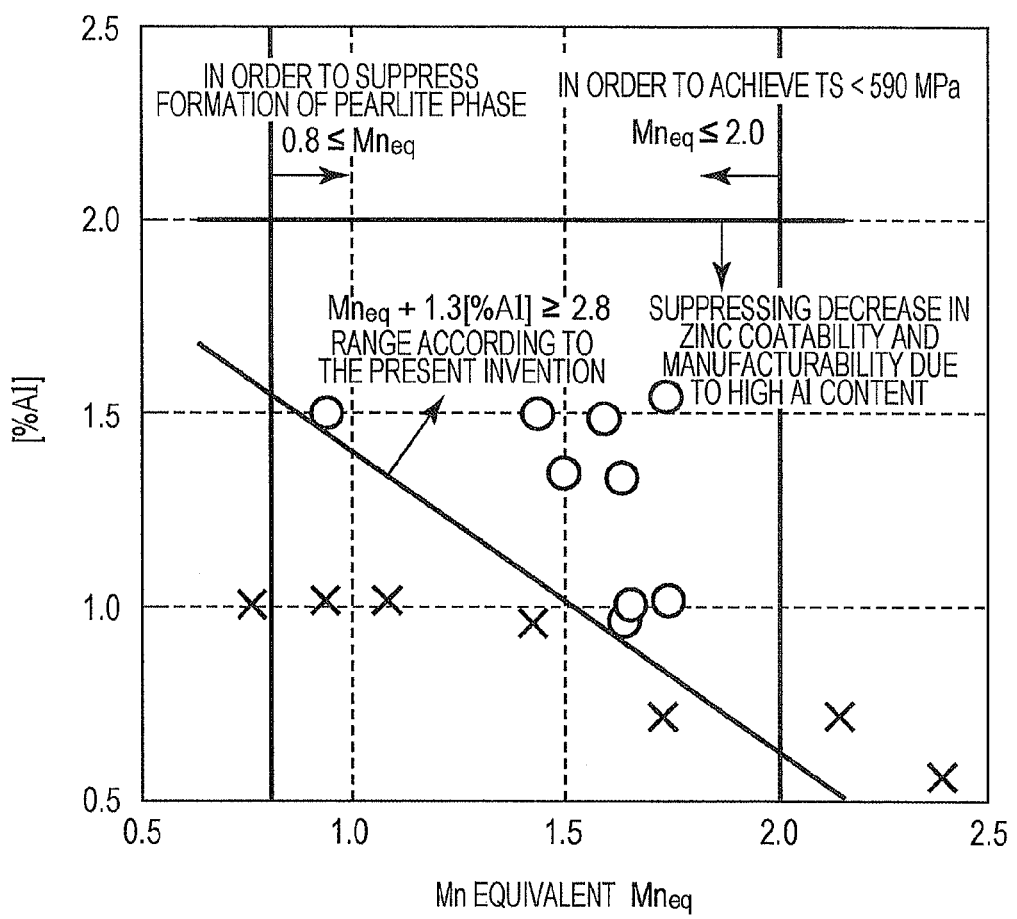
FIG. 2 is a diagram illustrating the investigation results regarding uniform elongation in the case where a Mn equivalent and an Al content of steel vary.

FIG. 2 illustrates the investigation results regarding uniform elongation of steel having a chemical composition containing C: 0.11%, Si: 0.01%, Mn: from 0.5% to 1.7%, P: 0.01%, S: 0.002%, Al: from 0.70% to 2.00%, Cr: 0.3%, N: 0.002% and B: from 0 to 0.001% when a Mn equivalent and an Al content vary. In the figure, ○ denotes a steel sheet having uniform elongation of 24% or more, x denotes a steel sheet having uniform elongation of less than 24%. The method for preparing the sample steel and the testing method were the same as described in the explanation of FIG. 1.

FIG. 2 indicates that high uniform elongation of 24% or more can be achieved in the region in which $Mn_{eq}$ is 0.8 or more and 2.0 or less and the relationship $Mn_{eq}+1.3[\%\ Al] \geq 2.8$ is satisfied. The reason why steel in the region in which the relationship $Mn_{eq}+1.3[\%\ Al]<2.8$ is satisfied has low uniform elongation is because there was a decrease in the amount of an austenite phase due to the formation of a pearlite or bainite phase during a holding time before dipping in a plating bath was performed. In addition, steel in the region of $Mn_{eq}>2.0$ has decreased uniform elongation due to a too high TS, and steel in the region of $Mn_{eq}<0.8$ has low uniform elongation due to the formation of a large amount of pearlite phase during cooling in air.

From the results described above, $Mn_{eq}+1.3[\%\ Al]$ is set to be 2.8 or more from the viewpoint of achieving high uniform elongation by achieving a stable retained austenite phase by controlling alloy elements, preferably 2.9 or more from the viewpoint of achieving a high TS×uniform elongation balance, more preferably 3.0 or more.

Cr: 0.10% or More and 0.40% or Less

Figure 3:
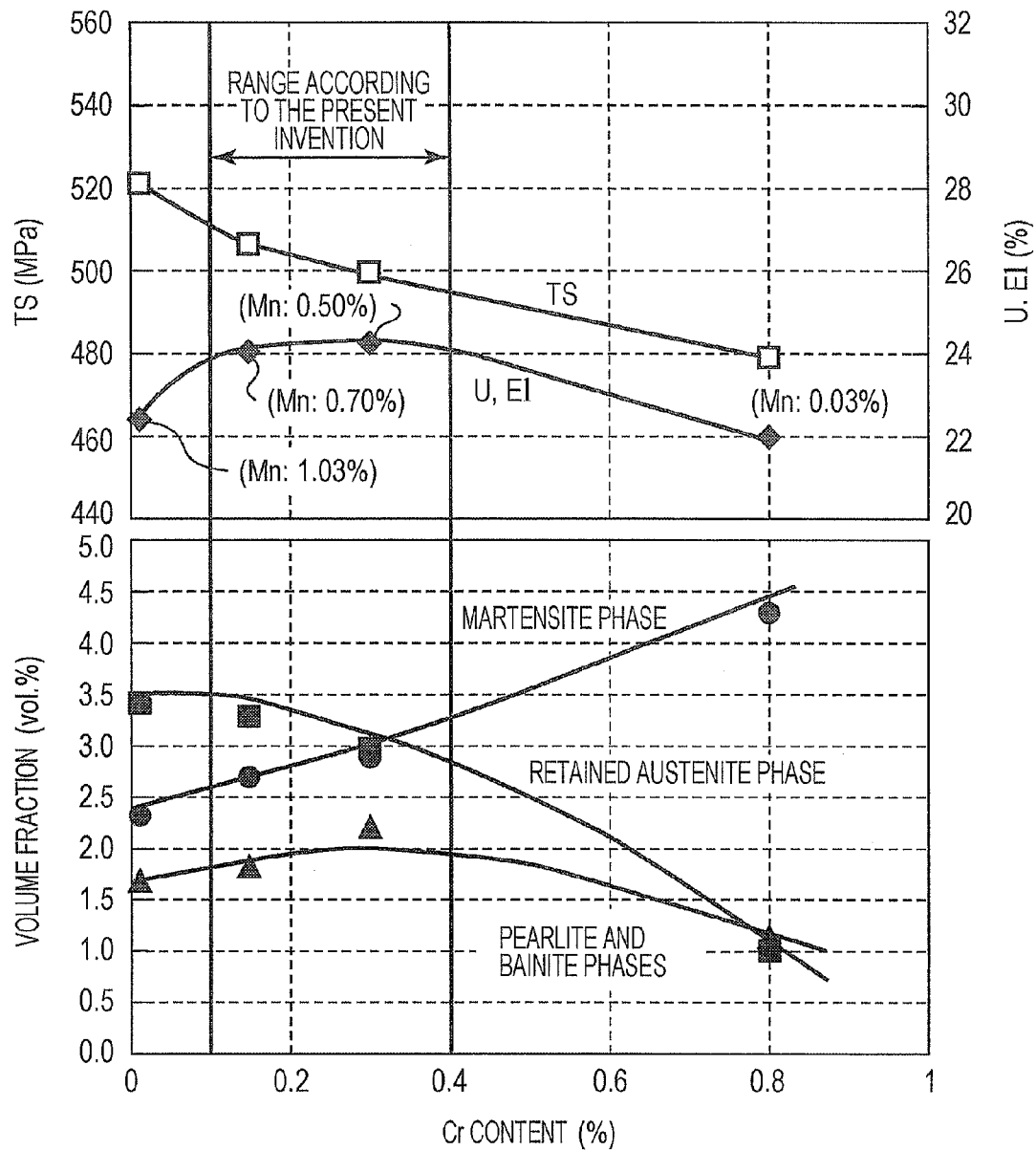
FIG. 3 is a diagram illustrating the influence of a Cr content on uniform elongation (U.El), a tensile strength (TS) and the contents of a retained austenite phase, a martensite phase, a pearlite phase and a bainite phase.

FIG. 3 illustrates the influence of a Cr content on uniform elongation, a tensile strength, the amount of a retained austenite phase, the amount of a martensite phase, the amount of a pearlite phase and the amount of a bainite phase of steel having a chemical composition containing C: 0.11%, Si: 0.01%, P: 0.01%, S: 0.002%, Al: 1.5%, N: 0.002%, B: from 0 to 0.001%, Cr: 0 (not added), 0.15%, 0.3% or 0.8% and Mn: from 0.03% to 1.03%, while a Mn equivalent being adjusted to about 1 (from 0.93 to 1.08) by controlling a Mn content. The method for preparing the steel is the same as described in the explanation of FIG. 1.

FIG. 3 indicates that the microstructure of steel becomes closer to a DP when a Cr content is increased, because there is an increase in the amount of formed martensite phase due to the formation of a retained austenite phase in the second phase being suppressed. The reason why the formation of a retained austenite phase is suppressed is thought to be because the formation of a bainitic ferrite phase is suppressed when the Cr content is increased as recognized in the observation of a microstructure. Although the reason why Cr suppresses the formation of a bainitic ferrite phase is not clear, it is thought that Cr delays the nucleation of a bainitic ferrite phase by delaying the diffusion of C in an austenite phase, since Cr has a high affinity for carbon. Therefore, it is necessary to keep the Cr content low in order to secure a retained austenite phase.

On the other hand, in the case where a Mn equivalent was adjusted only by using Mn without adding Cr, although the content of a retained austenite phase became 3% or more, uniform elongation (U.El) became a value less than that of 0.3% Cr steel by about 2%. This was because the absolute value of uniform elongation was decreased with nearly the same value for TS×U.El being kept due to the solid-solution strengthening of a ferrite phase caused by adding Mn by about 0.5% in order to compensate a Mn equivalent for absence of the Cr content of 0.3%. As described above, Cr is effective for increasing uniform elongation by substituting for Mn. The Cr content of 0.10% or more is necessary in order to realize this effect.

However, as FIG. 3 indicates, an excessive content of Cr causes a decrease in a TS×U.El balance by suppressing the formation of a retained austenite phase. Moreover, excessive addition of Cr causes an increase in alloy cost, because Cr is an expensive chemical element. Therefore, it is necessary that the Cr content be 0.40% or less from the viewpoint of securing a retained austenite phase and keeping cost for alloy low. As described above, the Cr content is preferably set to be 0.10% or more and 0.40% or less in the present invention from the viewpoint to of improving both a TS×U.El balance and U.El, preferably 0.35% or less.

B: 0.003% or Less (Including 0%)

B may be added as needed in order to promote concentration of carbon in austenite phase, because even a very small amount of B can strongly suppress pearlite transformation when cooling is performed after annealing. However, an excessive content of B of more than 0.003% causes an increase in hot rolling load and a decrease in hardenability by the precipitation of B carbide. From this point of view, the B content is set to be 0.003% or less (including 0%).

P: 0.05% or Less

P is effective, even added by small amount, for increasing hardenability and for suppressing pearlite transformation when cooling is performed after annealing as well as B. However, an excessive content of P causes an increase in strength more than necessary, because P is a chemical element which is very effective for solid-solution strengthening, and causes the deterioration of surface quality due to uneven plating caused by the delay of alloying and segregation. Therefore, the P content is set to be 0.05% or less, preferably 0.03% or less.

S: 0.02% or Less

The peeling property of the primary scale of a steel sheet can be improved so as to improve the final surface appearance quality of the plated steel sheet by containing an appropriate amount of S, and it is preferable that the S content be 0.001% or more to have such an effect on the steel sheet. However, an excessive content of S causes a decrease in surface quality of a steel sheet by causing the occurrence of cracks at the surface of the steel sheet when hot rolling is performed due to a decrease in hot ductility, and, further, causes a decrease in the ductility of the steel sheet by forming large MnS which becomes the origin of fracture. Therefore, the S content is set to be 0.02% or less, preferably 0.01% or less.

N: Less than 0.004%

N increases the strength of a microstructure by suppressing the grain growth of a ferrite phase by forming fine AlN in combination with Al in steel. In addition, in the case where a large amount of AlN is precipitated, there is a significant decrease in stability of manufacture in a continuous casting process due to a significant decrease in ductility. Therefore, N is a chemical element whose content should be as small as possible, and, from this point of view, the N content is set to be less than 0.004%, preferably less than 0.0035%.

Ti, Nb and V: 0.02% or Less Each

Ti, Nb and V all have a high affinity for N and are effective for fixing N in steel as metal nitrides, which results in a decrease in the amount of precipitated AlN. Therefore, these chemical elements are effective for suppressing the decrease in the grain growth of a ferrite phase and a decrease in hot ductility due to the precipitation of fine AlN. It is preferable that an each content of Ti, Nb and V be 0.002% or more in order to realize the effect of fixing N through use of these chemical elements. However, excessive addition of these chemical elements causes a significant increase in cost, because these chemical elements are all expensive, and further causes an increase in strength of a steel sheet, because these chemical elements tends to precipitate as fine carbides when annealing is performed. It is preferable that the each content of Ti, Nb and V be 0.02% or less.

Ni: 0.2% or Less

Ni may be added with a content f 0.05% or more as needed in order to suppress pearlite transformation, because Ni is a chemical element which is effective for stabilizing an austenite phase. However, excessive addition of Ni causes an increase in alloy cost and a decrease in ductility of steel. Therefore, in the case where Ni is added, the Ni content is set to be 0.2% or less.

Cu and Mo: Less than 0.1% Each

Cu and Mo may be added with an each content of 0.02% or more as needed in order to suppress pearlite transformation, because these chemical elements are effective for stabilizing an austenite phase. In addition, it is expected that these chemical elements are effective for suppressing the formation of cementite, even though the effect is not as large as that of Si or Al. However, these chemical elements cause a significant increase in alloy cost, because they are both expensive chemical elements. Moreover, it is not preferable that a large amount of these chemical elements be contained, because it causes an increase in the strength of a steel sheet by solid-solution strengthening and the refinement of steel microstructure. Therefore, in the case where Cu and Mo are added, the each content of these chemical elements is set to be less than 0.1%, preferably less than 0.05%.

Sb and Sn: 0.2% or Less Each

Sb and Sn may be added with an each content of 0.004% or more as needed, because oxidation and nitridation at the surface of a steel sheet can be suppressed by adding a small amount of these chemical elements. However, a large content of these chemical elements causes an increase in strength, decrease in toughness and an increase in cost. Therefore, in the case where Sb and Sn are added, the each content of these chemical elements is set to be 0.2% or less.

Ca and REM: 0.01% or Less

Ca and REM may be added with an each content of 0.002% or more as needed in order to fix S in steel, because these chemical elements have a high affinity for S, and in order to control the shape of an inclusion of S which becomes the origin of fracture by growing in steel when hot rolling and cold rolling are performed. However, the effects of these chemical elements saturate when they are added with an each content of more than 0.01%. Therefore, in the case where Ca and REM are added, the each content of these chemical elements is set to be 0.01% or less.

The remainder of the chemical composition other than chemical elements described above is Fe and inevitable impurities.

[Microstructure]

The high strength galvanized steel sheet according to the present invention preferably has, besides the chemical composition described above, a microstructure containing a ferrite phase as a parent phase and the volume fraction of the second phase of 15% or less, the second phase having the volume fraction of a martensite phase of 3% or more, the volume fraction of a retained austenite phase of 3% or more and the sum of the volume fractions of pearlite and bainite phases being equal to or less than the volume fraction of the martensite phase and the volume fraction of retained austenite phase. This results in a tensile strength of 440 MPa or more and less than 590 MPa and in excellent formability. The preferred microstructure of the high strength galvanized steel sheet according to the present invention will be described hereafter.

Here, although ferrite and bainitic ferrite phases are slightly different in microstructure form, the both will be treated as a ferrite phase without distinction, because it is not easy to distinguish between the both microstructures by using an optical microscope or a scanning electron microscope, and because the properties of the both phase are comparatively similar to each other. The second phase is a generic term used to refer to a microstructure having a phase other than ferrite phase in the steel microstructure. A pearlite phase refers to a laminated structure consisting of ferrite and cementite phases. A bainite phase refers to a hard microstructure in which fine carbides are dispersed in a needle-like or plate-like ferrite phase and which is formed through transformation from an austenite phase at a comparatively low temperature (martensite transformation point or higher). A microstructure in which only the hard ferrite phase described above is formed without the formation of carbide, which is generally called a bainitic ferrite phase, is, as well as a polygonal ferrite phase, included in the category of a ferrite phase, unless otherwise noted.

Although there is a case where some portion of a martensite phase becomes a tempered martensite phase which is formed by tempering in the middle of a cooling process, this portion is not distinguished from a martensite phase, because this portion is also sufficiently hard. Although martensite and retained austenite phases are difficult to be etched and thus are difficult to be distinguished by using a microscope, the volume fraction of a retained austenite phase can be obtained by using an X-ray diffraction method. The volume fraction of a martensite phase is derived by subtracting those of all the other phases than the martensite phase from that of the second phase. Here, % representing the volume fraction of a phase refers to a volume percentage, unless otherwise noted.

The Volume Fraction of the Second Phase: 15% or Less

In the case where the volume fraction of the second phase is more than 15%, there is an increase in a tensile strength and a decrease in ductility, even if solid-solution strengthening is suppressed by alloying elements. Therefore, the volume fraction of the second phase is to be 15% or less, preferably 14% or less. That is to say, the steel sheet according to the present invention preferably has a microstructure containing the volume fraction of a ferrite phase of 85% or more, preferably 86% or more.

The Volume Fraction of a Retained Austenite Phase: 3% or More

The volume fraction of a retained austenite phase of the steel sheet according to the present invention is very important for achieving high uniform elongation by utilizing a TRIP effect of a retained austenite phase. It is necessary that the volume fraction of a retained austenite phase be 3% or more in order to achieve high uniform elongation. In the case of the volume fraction of less than 3%, uniform elongation becomes less than 24%. It is preferable that the volume fraction be 4% or more in order to achieve further excellent uniform elongation.

The Volume Fraction of a Martensite Phase: 3% or More

The volume fraction of a martensite phase of the steel sheet according to the present invention is very important for suppressing yield point elongation (YPEl) by dispersing a small amount of martensite phase in which C is appropriately concentrated. It is appropriate that the volume fraction of a martensite phase be 3% or more in order to suppress yield point elongation and preferable that the volume fraction be 4% or more. However, it is preferable that the volume fraction be 10% or less, because the excessive volume fraction of martensite phase causes an increase in the strength of a microstructure.

The volume fractions of pearlite and bainite phases: equal to the volume fraction of martensite phase and the volume fraction of retained austenite phase or less The formation of the second phase containing precipitated carbide such as a pearlite or bainite phase causes a decrease in the amount of formation of retained austenite or martensite phase and in the amount of concentrated C, which results in a decrease in uniform elongation and the occurrence of YPEl.

Figure 4:
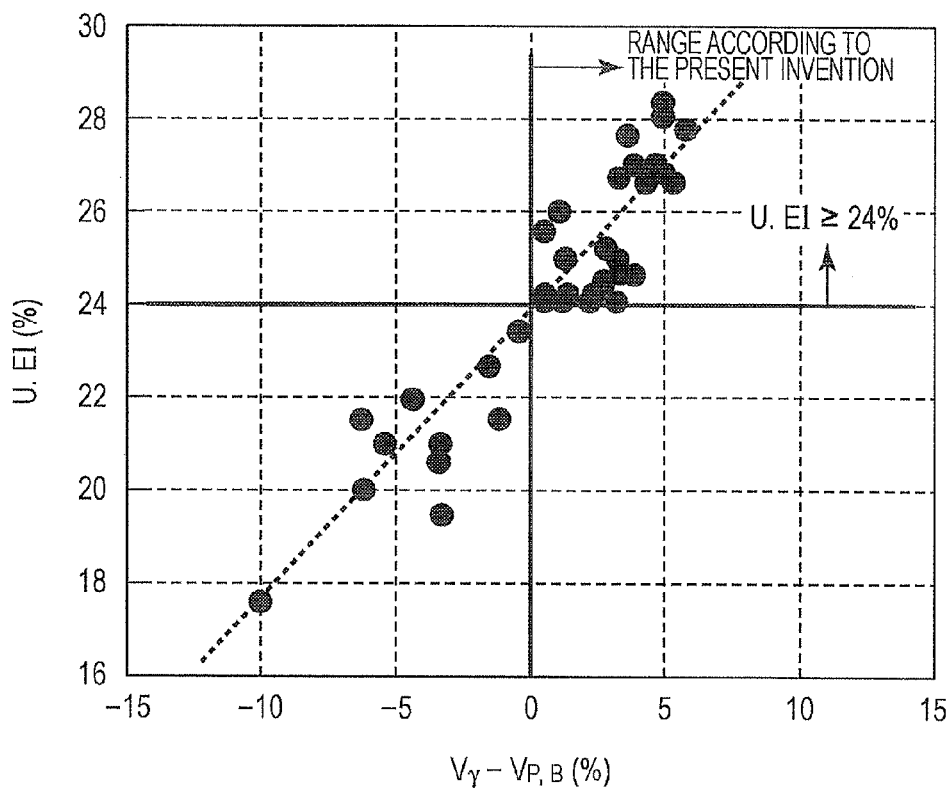
FIG. 4 is a diagram illustrating the influence of the difference of the volume fraction of a retained austenite phase and the sum of the volume fractions of a pearlite phase and a bainite phase on uniform elongation (U.El).
Figure 5:
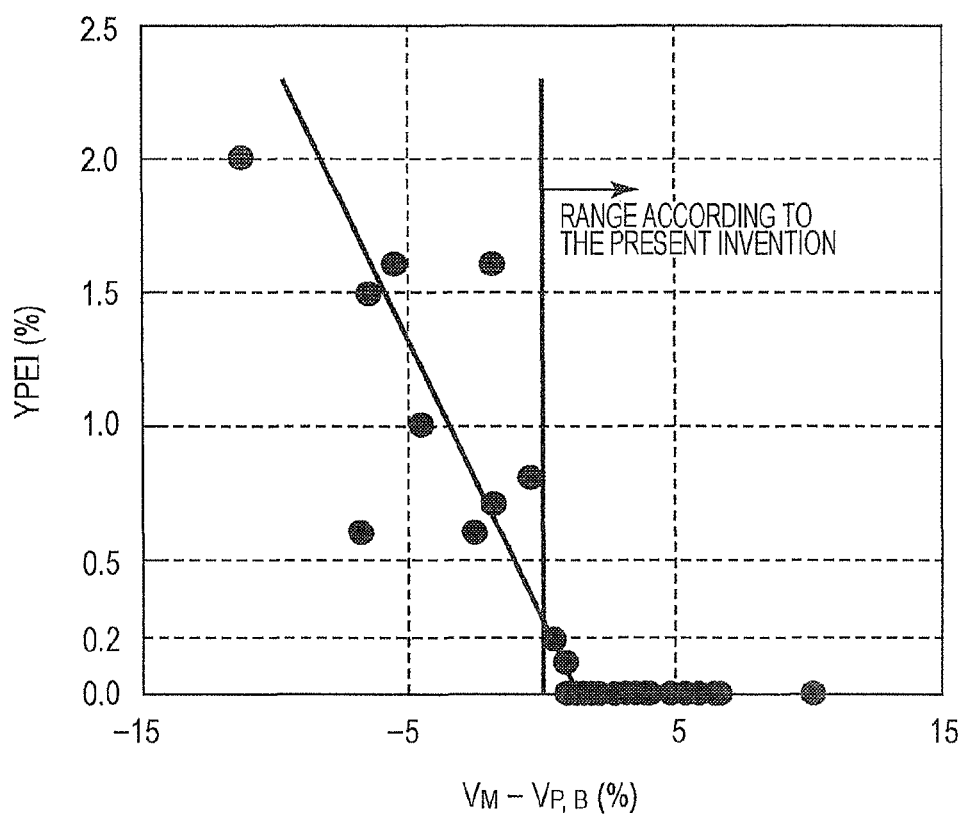
FIG. 5 is a diagram illustrating the influence of the difference of the volume fraction of martensite phase and the sum of the volume fractions of a pearlite phase and a bainite phase on yield point elongation (YPEl).

Therefore, the influence of the microstructure constitution in the second phase on uniform elongation (U.El) and yield point elongation (YPEl) was investigated. FIGS. 4 and 5 illustrate the change in the mechanical properties of steel due to the change in the microstructure constitution of the steel having a chemical composition containing C: from 0.080% to 0.160%, Si: from 0.01% to 0.02%, Mn: from 0.50% to 1.31%, P: from 0.01% to 0.03%, S: from 0.002 to 0.008%, Al: from 0.97% to 1.55%, Cr: from 0.15% to 0.32%, B: from 0% to 0.001%, N: from 0.0020% to 0.0035%, $Mn_{eq}$: from 0.93 to 1.74 and $Mn_{eq}+1.3Al$: from 2.88 to 3.76. Specifically, FIG. 4 illustrates the influence of the difference between the volume fraction of a retained austenite phase and the sum of the volume fractions of pearlite and bainite phases on uniform elongation (U.El), and FIG. 5 illustrates the influence of the difference between the volume fraction of a martensite phase and the sum of the volume fraction of pearlite and bainite phases on yield point elongation (YPEl). In these figures, ● denotes a steel sheet having a tensile strength of 440 MPa or more and less than 590 MPa and one of the various microstructure constitutions.

The method for preparing a test piece will be described hereafter. A slab having the chemical composition described above and a thickness of 27 mm was heated up to a temperature of 1200° C., then the slab was hot-rolled with a finishing temperature of from 870° C. to 970° C. down to a thickness of 4 mm, then the hot-rolled steel sheet was immediately cooled with water spray and then the steel sheet was subjected to coiling treatment at a temperature of from 450° C. to 650° C. for a duration of one hour. This hot-rolled steel sheet was cold-rolled with a rolling ratio of 80% into a cold-rolled steel sheet having a thickness of 0.80 mm. This cold-rolled steel sheet was annealed under conditions for a dual phase, that is, at a temperature of from 740° C. to 900° C. for a duration of 120 seconds, then cooled at a mean cooling rate of from 1°

C./s to 30° C./s down to a temperature range from 550° C. to 700° C. and stopped primary cooling, then cooled at a mean cooling rate of 25° C./s down to a temperature of 470° C., then immediately held at the constant temperature for a duration of from 20 seconds to 200 seconds, then dipped in a galvanizing bath at a temperature of 460° C., then held at a temperature of 510° C. for a duration of 20 seconds for an alloying treatment, then cooled at a mean cooling rate of 20° C./s down to a temperature range of 200° C. or lower, then cooled at a mean cooling rate of 10° C./s down to room temperature and then subjected to skin pass rolling with an elongation ratio of 0.5%.

A tensile test was carried out in the method conforming to JIS Z 2241 with a JIS No. 5 tensile test piece cut out of the steel sheet obtained as described above. In addition, the observation described below was conducted in order to derive the volume fractions of the microstructures of the steel sheet. The L-section (a vertical cross section parallel to the rolling direction) of the steel sheet was polished and etched with a nital solution, then the photographs of the microstructures of 10 fields in the cross section were taken by using a scanning electron microscope at a magnification of 3000 times, then a grid having 700 grid points in total (a grid which consists of rectangles having a size of 1.5 μm×1 μm each formed by 25 vertical parallel lines placed at even intervals of 1.5 μm with 28 horizontal parallel lines placed at right angle with the vertical lines at even intervals of 1 μm) was placed on the photograph, and then the area ratio of the second phase was determined by observing the ratio of the number of grid points found on the second phase to the total number of the grid points. Since the area ratios at the L-section determined as described above had nearly the same values as that determined in a vertical cross section at right angle to the rolling direction, it was understood that there was no anisotropy in the area ratio, and the volume ratio of the second phase was defined as the area ratio in the L-section described above.

In the photograph of a microstructure, a dark colored area was recognized as a ferrite phase, an area in which lamellar carbide was observed in a ferrite phase was recognized as a pearlite phase, an area in which a dot sequence of carbide was observed in a ferrite phase was recognized as a bainite phase, and the other areas which were lighter than the ferrite phase was recognized as a martensite or retained austenite phase. The volume ratios of areas which were recognized as pearlite, bainite, martensite and retained austenite phases were observed and a volume fraction of the second phase was defined as the sum of those volume ratios.

The method for deriving the volume ratio of a retained austenite phase will be described hereafter.

The portion at a quarter of a thickness of a steel sheet was exposed by performing polishing and chemical polishing, then the integrated intensities of diffracted X-ray from {200}, {211} and {220} planes of a ferrite phase and {200}, {220} and {311} planes of an austenite phase of steel were observed at the portion by using X-ray diffractometer (RINT2200 manufactured by Rigaku Corporation) with Mo—Kα ray being used as a radiation source and with an acceleration voltage of 50 keV, and then the volume ratio of a retained austenite phase was derived from the observed values by using the equation described in the Non Patent Literature (Rigaku Electric Corporation: The Handbook of X-Ray Diffractometry (2000), p 26, 62-64). The volume ratio of a martensite phase was derived by subtracting that of a retained austenite phase observed by using X-ray diffractometry from the sum of those of martensite and retained austenite phases derived by performing the observation of a microstructure as described above.

FIG. 4 indicates that uniform elongation (U.El) becomes 24% or more in the case where the sum of the volume fractions of pearlite and bainite phases is less than the volume fraction of a retained austenite phase, that is to say, the difference is 0 or more.

FIG. 5 indicates that yield point elongation (YPEl) disappears in the case where the sum of the volume fractions of pearlite and bainite phases is less than the volume fraction of a martensite phase, that is to say, the difference is 0 or more. For these reasons, it is necessary that the sum of the volume fractions of pearlite and bainite phases be controlled to be equal to the volume fraction of martensite phase and the volume fraction of retained austenite phase or less. It is preferable that the sum of the volume fractions of pearlite and bainite phase be 3% or less, more preferably 1% or less.

According to the present invention, a high strength galvanized steel sheet having a tensile strength of 440 MPa or more and less than 590 MPa and uniform elongation (U.El) of 24% or more and suppressing the occurrence of yield point elongation (YPEl) can be obtained by controlling the chemical composition and the microstructure as described above.

A strength-ductility (TS×EL) balance and a strength-uniform elongation (TS×U.El) balance, which are the product of ductility and tensile strength, and the product of the absolute value of uniform elongation and a tensile strength, respectively, are used as the indicators of a steel sheet having high strength and excellent ductility. It is preferable that the TS×EL balance be 19000 MPa·% or more from the viewpoint of achieving high strength and excellent press-formability, more preferably 19500 MPa·% or more, further more preferably 20000 MPa·% or more. Similarly, it is preferable that the TS×U.El balance be 12000 MPa·% or more, more preferably 12500 MPa·% or more, further more preferably 13000 MPa·% or more.

Moreover, it is necessary to suppress the occurrence of stretcher strain of a steel sheet from the viewpoint of achieving excellent surface appearance quality after press forming has been performed. Since there is a case where clear stretcher strain occurs when yield point elongation is more than 0.2%, it is preferable that YPEl be 0.2% or less, more preferably 0.1% or less, further more preferably 0%.

[Manufacturing Method]

According to the present invention, a high strength steel sheet having excellent formability and zinc coatability can be obtained by controlling the microstructure of the steel having a specified chemical composition as described above. The method for manufacturing such a high strength steel sheet will be described hereafter.

A heating temperature before hot rolling is set to be 1100° C. or higher and 1250° C. or lower. In the case where the heating temperature is lower than 1100° C., there is an increase in rolling load when hot rolling is performed. In addition, since the $Ae_3$ temperature of a steel having the chemical composition is high due to a high Al content and a low Mn content, there is the possibility that a large amount of ferrite phase is formed, because the portion of a steel sheet such as edges is locally cooled down to a temperature of the $Ae_3$ temperature or lower when hot rolling in performed in the case where a slab heating temperature is lower than 1100° C. This results in the variability of material properties and the deterioration of the shape of the steel sheet due to a non-uniform microstructure of the hot rolled steel sheet. On the other hand, although, in the case where the heating temperature is high, uniform distribution of alloy element and microstructure and a decrease in rolling load can be achieved, there is an non-uniform increase in formed oxidized scale on the surface of the slab in the case where the heating temperature is higher than 1250° C., which results in the deterioration of surface appearance quality. Therefore, the slab heating temperature is set to be 1250° C. or lower.

Although there is no limitation on hot rolling conditions and it is appropriate to perform hot rolling in common methods, it is preferable that a finishing temperature be 850° C. or higher and 950° C. or lower. Since a temperature of lower than 850° C. is in the range for ferrite transformation, the formation of a ferrite phase is significantly promoted in the case where the finishing temperature is lower than 850° C., which makes it difficult to achieve stable material properties, because the formation of a non-uniform microstructure in a steel sheet and abnormal grain growth in the vicinity of the surface of the steel sheet tend to occur. On the other hand, the formation of the secondary scale is promoted in the case where the finishing temperature is higher than 950° C., which results in the deterioration of surface appearance quality.

There is no limitation on the range of a mean cooling rate after hot finishing rolling until coiling. It is necessary that a hot-rolled steel sheet be coiled at a temperature of higher than 500° C. after being cooled in an arbitrary method. This is for the purpose of making the microstructure of the hot-rolled steel sheet a ferrite+pearlite microstructure, which makes it possible to achieve low strength of the hot-rolled steel sheet and suppress an increase in rolling load of cold rolling which is the next process. Moreover, since chemical elements which are effective for stabilizing an austenite phase such as C, Mn and Cr which are uniformly distributed once when slab heating is performed tend to be locally distributed from a ferrite phase to a pearlite phase, the stabilization of an austenite phase tends to be promoted, because the local distribution is retained even after annealing has been performed. In addition to the fact described above, since the internal oxidization of chemical elements which are easily oxidized tends to be promoted, there is an increase in zinc coatability, because the concentration of alloy elements in the vicinity of the surface of the steel sheet is decreased when the following annealing is performed. On the other hand, in the case where the coiling temperature is 500° C. or lower, there is an increase in rolling load of cold rolling due to an increase in the amount of formed low-temperature transformation phases, and there are decreases in local distribution of the alloy elements and zinc coatability due to a decrease in internal oxidization. It is preferable that the volume fraction of a ferrite+pearlite microstructure be 80 vol. % or more in the microstructure of a hot-rolled steel sheet from the viewpoint of rolling load of cold rolling, more preferably 90 vol. % or more.

After coiling this hot-rolled steel sheet, pickling is performed, and then cold rolling is performed. Although there is no limitation on cold rolling conditions and it is appropriate to use common methods, it is preferable that cold rolling ratio be from 40% to 90% in order to achieve target properties.

The cold-rolled steel sheet obtained as described above is heated up to an annealing temperature of from 750° C. to 950° C. and held at the temperature for a duration of from 20 seconds to 200 seconds. This results in that entire carbide in the microstructure is dissolved and an austenite phase is formed and that the concentration of chemical elements which are effective for stabilizing an austenite phase such as C, Mn and Cr into an austenite phase is promoted. In the case where the annealing temperature is lower than 750° C. and the holding time is less than 20 seconds, undissolved carbide is retained, which may results in a decrease in ductility. It is preferable that the annealing temperature be 770° C. or higher from the viewpoint of sufficiently dissolving carbide. However, since load on annealing equipment is large in the case where the equipment is operated at a soaking temperature of higher than 950° C., the annealing temperature is set to be 950° C. or lower. In addition, since a holding time at a soaking temperature of more than 200 seconds causes an increase in the length of the equipment or a significant decrease in production speed, the holding time is set to be 200 seconds or less.

Immediately after annealing, primary cooling is performed. A primary cooling process is a very important process for determining the volume fraction of a ferrite phase of the steel sheet according to the present invention. Although there is an increase in ductility due to an increase in the volume fraction of a ferrite phase in the case where a stopping temperature of primary cooling is low, pearlite transformation occurs in the case where the stopping temperature is too low, which results in a decrease in uniform elongation.

Figure 6:
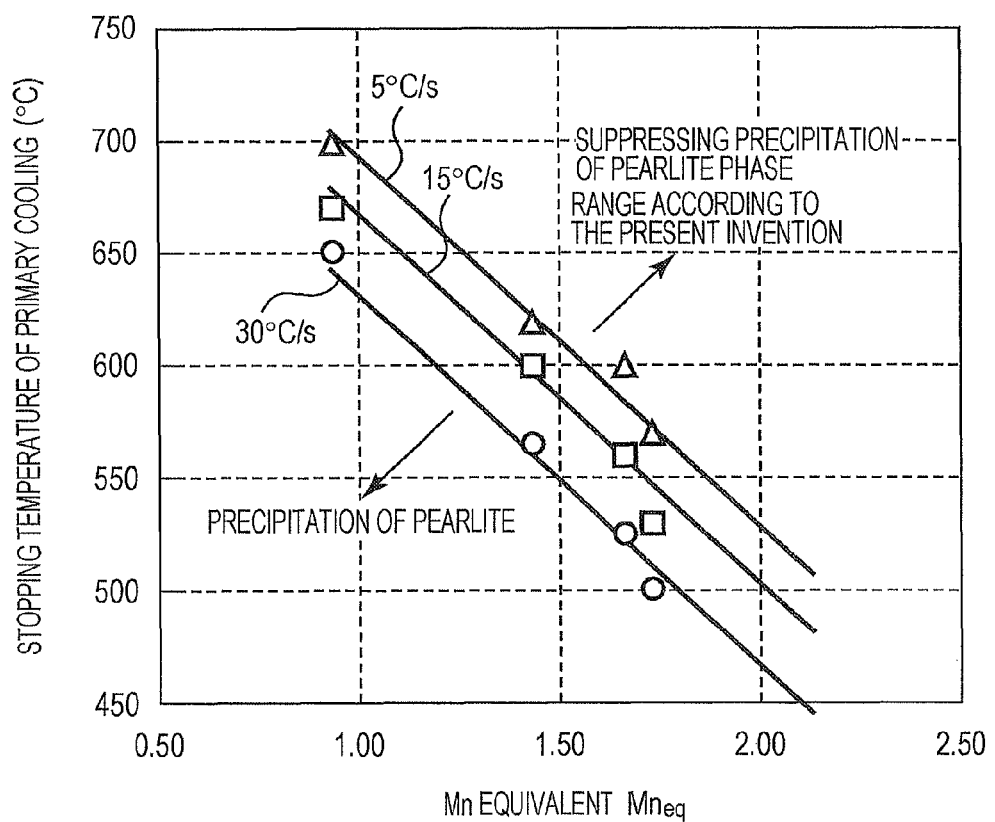
FIG. 6 is a diagram illustrating the investigation results regarding a temperature at which a pearlite phase is formed when steel sheets having various Mn equivalents ($Mn_{eq}$) are continuously cooled at various cooling rates.

Therefore, investigations on an appropriate stopping temperature of primary cooling were conducted. FIG. 6 illustrates the investigation results of a temperature at which pearlite transformation occurs when steel sheets having chemical compositions containing C: 0.11%, Si: 0.01%, Mn: from 0.5% to 1.3%, P: from 0.01 to 0.03%, S: 0.002%, Al: from 1.00% to 1.50%, Cr: 0.3%, N: 0.002% and B: from 0% to 0.001% and various Mn equivalents ($Mn_{eq}$) are continuously cooled at various mean cooling rates. In the figure, Δ denotes a temperature at which the formation of pearlite phase occurred in the case of a mean cooling rate of 5° C./s, □ denotes that in the case of 15° C./s and ○ denotes that in the case of 30° C./s.

The method for preparing a test piece will be described hereafter. A slab having the chemical composition described above and a thickness of 27 mm was heated up to a temperature of 1200° C., then the slab was hot-rolled with a finishing temperature of 950° C. down to a thickness of 4 mm, then the hot-rolled steel sheet was immediately cooled with water spray and then the steel sheet was subjected to coiling treatment at a temperature of 580° C. for a duration of one hour. This hot-rolled steel sheet was cold-rolled with a rolling ratio of 80% into a cold-rolled steel sheet having a thickness of 0.80 mm. This cold-rolled steel sheet was annealed under conditions for a dual phase, that is, at a temperature of 850° C. for a duration of 120 seconds, then cooled at a mean cooling rate of 5° C./s, 15° C./s or 30° C./s down to a temperature of various temperature from 500° C. to 700° C., and then cooled with water. It was confirmed whether or not there is a pearlite phase by observing the microstructure of the steel sheet obtained as described above by using a scanning electron microscope at a magnification of 3000 times.

FIG. 6 indicates that a temperature at which the formation of a pearlite phase starts changes in proportion to the change in a Mn equivalent ($Mn_{eq}$) and a cooling rate and that the higher the Mn equivalent ($Mn_{eq}$) and the larger the cooling rate (CR (° C./s)), the lower the temperature. From this result, the temperature at which the formation of a pearlite phase starts can be expressed as a critical primary cooling temperature $T_{crit}$ by the following equation.

$$T_{crit}=870-2.5(66 \times Mn_{eq}+CR)$$

In the case where a stopping temperature of primary cooling is equal to $T_{crit}$ or higher, only ferrite transformation proceeds, which results in the promotion of an increase in the volume fraction of a ferrite phase and concentration of C in an austenite phase.

Moreover, in order to investigate the influence of a stopping temperature of primary cooling on uniform elongation (U.El), steel having a chemical composition containing C: 0.11%, Si: 0.01%, Mn: 1.0%, P: 0.01%, S: 0.002%, Al: 1.50%, Cr: 0.3%, N: 0.002% and B: 0% was processed on the same conditions as in the case of FIG. 6 until cold rolling, then annealed under conditions for a dual phase, that is, at a temperature of 850° C. for a duration of 120 seconds, then cooled at a mean cooling rate of 15° C./s down to a stopping temperature of primary cooling of from 550° C. to 800° C., then cooled at a mean cooling rate of 25° C./s as secondary cooling, then held at a temperature of 470° C. for a duration of 40 seconds, then dipped in a galvanizing bath at a temperature of 460° C., then held at a temperature of 510° C. for a duration of 20 seconds for alloying, then cooled at a mean cooling rate of 20° C./s down to the temperature range of 200° C. or lower, then further cooled at a mean cooling rate of 10° C./s down to room temperature, and then subjected to skin pass rolling with an elongation rate of 0.5%.

Figure 7:
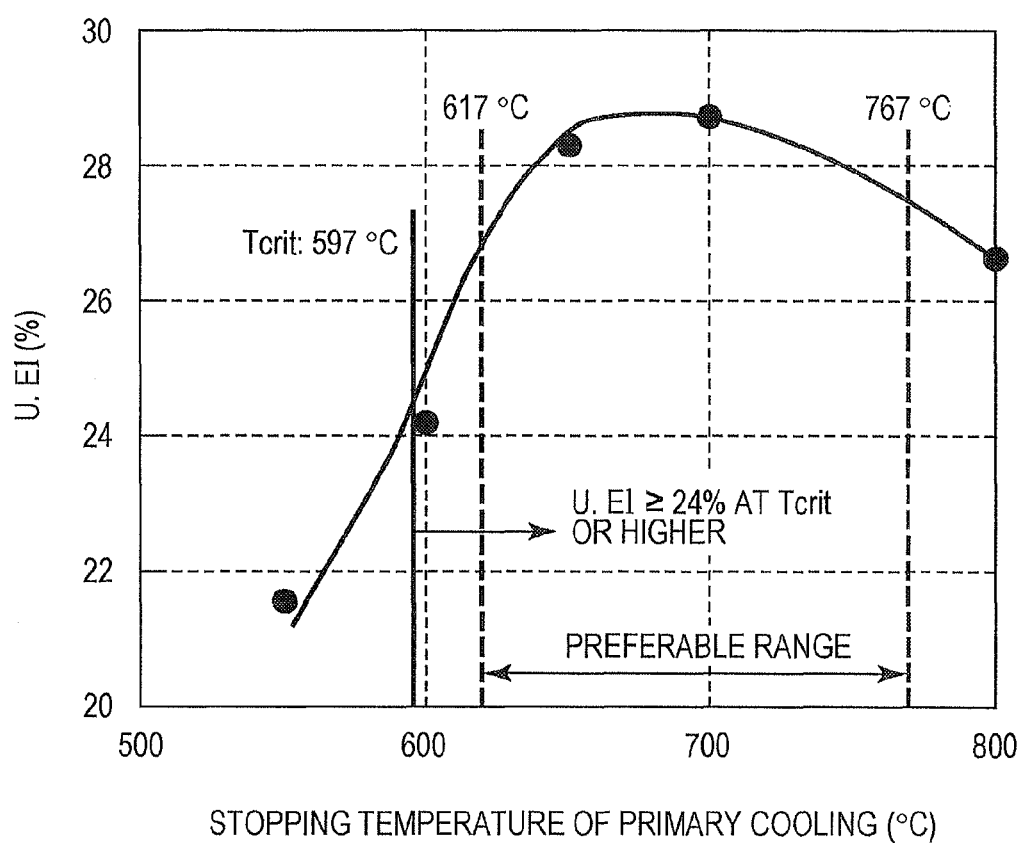
FIG. 7 is a diagram illustrating the influence of the stopping temperature of primary cooling on uniform elongation (U.El).

FIG. 7 illustrates the relationship between a stopping temperature of primary cooling and uniform elongation (U.El) of the steel sheet obtained as described above. FIG. 7 indicates that, in the case where the stopping temperature of primary cooling is equal to a critical primary cooling temperature $T_{crit}$ or higher, the formation of a pearlite phase during the primary cooling is suppressed, which results in obtaining high uniform elongation. Therefore, the stopping temperature of primary cooling is determined to be equal to the critical primary cooling temperature $T_{crit}$ or higher. However, in the case where the stopping temperature of primary cooling is too near to the critical primary cooling temperature $T_{crit}$, the formation of a pearlite phase partially becomes easy during a secondary cooling, which results in a decrease in uniform elongation. Therefore, it is preferable that the stopping temperature of primary cooling be equal to $T_{crit}+20°$ C. or higher in order to achieve more excellent uniform elongation. On the other hand, in the case where the stopping temperature of primary cooling is too high, there is a lack of C concentration in an austenite phase and an increase in the ratio of a bainitic ferrite phase which is the harder kind of phase among kinds of ferrite phase, which results in a decrease in uniform elongation. Therefore, it is preferable that the stopping temperature of primary cooling be equal to $T_{crit}+170°$ C. or lower in order to achieve sufficient ferrite transformation in a primary cooling process.

In the case where the steel sheet according to the present invention is cooled at a mean cooling rate in primary cooling of less than 5° C./s, pearlite transformation becomes easy to occur, which results in a decrease in uniform elongation becoming easy to occur. Therefore, the mean cooling rate in primary cooling is set to be 5° C./s or more, more preferably more than 10° C./s in order to sufficiently avoid pearlite transformation. On the other hand, in the case where the mean cooling rate in primary cooling is more than 40° C./s, the cooling rate is too large for ferrite transformation to sufficiently proceed. Therefore, the mean cooling rate in primary cooling is set to be 40° C./s or less, preferably 20° C./s or less.

Subsequently, secondary cooling is performed from the stopping temperature of primary cooling to an intermediate holding temperature in a range from 410° C. to 500° C. at a mean cooling rate of 15° C./s or more. By this cooling method, the nose of pearlite transformation is avoided. It is more preferable that the mean cooling rate be 20° C./s or more, because the larger the secondary cooling rate, the more advantageously the formation of a pearlite phase can be avoided. However, since it is difficult to perform cooling at a cooling rate of more than 100° C./s in common equipment, it is preferable that the cooling rate be 100° C./s or less.

Subsequently, by holding the steel sheet at a temperature in the range of intermediate holding temperature from 410° C. to 500° C. for a duration of 10 seconds or more, bainitic ferrite phase is formed and C concentration in an austenite phase is promoted. In the case where the holding time is less than 10 seconds, the formation of a bainitic ferrite phase does not sufficiently proceed and there is a lack of the volume fraction and the stability of a retained austenite phase, which results in a decrease in uniform elongation. On the other hand, even if the steel sheet is held at a temperature in this range for a duration of more than 180 seconds, an austenite phase is degraded into a pearlite or bainite phase, which results in a significant decrease in uniform elongation. Therefore, the holding time in the range of intermediate holding temperature is set to be 180 seconds or less, preferably 140 seconds or less from the viewpoint of achieving high uniform elongation.

In the case where intermediate holding is started in a temperature range over 500° C., a large amount of pearlite phase is formed in a short time, which results in a significant decrease in uniform elongation and the occurrence of yield point elongation (YPEl). In addition, in the case where the intermediate holding temperature is lower than 410° C., a large amount of bainite phase is formed, which also results in a significant decrease in uniform elongation and the occurrence of YPEl. Therefore, intermediate holding temperature is set to be 410° C. or higher and 500° C. or lower, preferably 420° C. or higher and 490° C. or lower.

The steel sheet which has been subjected to the intermediate holding as described above is dipped in a galvanizing bath, and then cooled at a mean cooling rate of 10° C./s or more. In addition, an alloying treatment may be performed as needed by heating the galvanized steel sheet up to a temperature in the range from 490° C. to 600° C. and by holding the steel sheet at the temperature for a duration of from 3 seconds to 100 seconds. In the case where the temperature of an alloying treatment is lower than 490° C., alloying does not sufficiently proceed. In the case where the temperature of an alloying treatment is higher than 600° C., alloying is significantly promoted, which results in the galvanized film being easily peeled due to the hardening of the film, and further an austenite phase transforms into a pearlite phase, which results in a decrease in uniform elongation and the occurrence of YPEl.

This galvanized steel sheet may be subjected to skin pass rolling in order to adjust the surface roughness and to flatten the shape of the steel sheet. However, since an excessive reduction in skin pass rolling causes a decrease in uniform elongation, it is preferable that the elongation ratio in skin pass rolling be 0.2% or more and 0.6% or less.

By using the manufacturing method described above, a high strength galvanized steel sheet having uniform elongation and excellent zinc coatability can be manufactured without using complex processes.

EXAMPLES

The examples of the present invention will be described hereafter.

The chemical compositions of the steel samples are given in Table 1 and the manufacturing conditions are given in Table 2. Steel having a chemical composition given in Table 1 was melted by using a vacuum melting furnace and cast into a slab. The slab was reheated up to a temperature in the range from 1150° C. to 1290° C., and then made a sheet bar having a thickness of 27 mm by performing rough rolling. Subsequently, the sheet bar was made a hot-rolled steel sheet having a thickness of 4 mm by performing hot finishing rolling in the temperature range from 870° C. to 980° C., then the hot-rolled steel sheet was cooled with a water spray down to a temperature in the range from 450° C. to 650° C., and then subjected to a treatment equivalent to coiling by holding the hot-rolled steel sheet in a heating furnace at the temperature for a duration of one hour. The scale of the hot-rolled steel sheet was removed by performing pickling, and then the steel sheet was cold-rolled with a rolling ratio of 80% into a cold-rolled steel sheet having a thickness 0.8 mm. The cold-rolled steel sheet obtained as described above was subjected to heating for annealing, primary cooling, secondary cooling and intermediate holding under the temperature conditions given in Table 2, then dipped in a galvanizing bath at a temperature of 460° C. Then, some of the dipped steel sheets were made galvanized steel sheets by performing cooling at a mean cooling rate of 10° C./s, and the others were made galvannealed steel sheets by further performing an alloying treatment at a temperature of 510° C. for a duration of 20 seconds. Then, the each steel sheet was subjected to skin pass rolling with an elongation ratio of 0.5%.

The mechanical properties (TS, YPEl, U.El and El) were evaluated by conducting a tensile test conforming to JIS Z 2241 (1998). A JIS NO. 5 tensile test piece was cut out of the coated steel sheet obtained as described above along the longitudinal direction thereof. In addition, the volume fractions of microstructures were observed. Moreover, the surface appearance of zinc coating was evaluated.

Moreover, the stretch-flangeability of the obtained steel sheet was also evaluated. Stretch-flangeability was evaluated by conducting a hole expanding test conforming to The Japan Iron and Steel Federation Standard JFS T 1001 (1996). That is to say, a hole was punched in a sample of 100 mm×100 mm cut out of the annealed steel sheet with a punch having a diameter of 10 mm and a die having a diameter of 10.2 mm (clearance of 12.5%), then the sample was subjected to hole expanding work with a conical punch having a vertex angle of 60° with burrs which was formed when the hole was punched coming outside, and then, when a crack penetrated the thickness of the steel sheet, a hole expansion ratio $\lambda(\%)=\{(d-d_0)/d_0\}\times 100$ was derived from $d_0$: an initial hole diameter (mm) and d: a hole diameter (mm) when a crack occurred.

The volume fractions of microstructures were determined in the following way. The L-section (a vertical cross section parallel to the rolling direction) of the steel sheet was polished and etched with a nital solution, then photographs of the microstructures of 10 fields in the cross section were taken by using a scanning electron microscope at a magnification of 3000 times, then a grid having 700 grid points in total (a grid which consists of rectangles having a size of 1.5 μm×1 μm each formed by 25 vertical parallel lines placed at even intervals of 1.5 μm with 28 horizontal parallel lines placed at right angle with the vertical lines at even intervals of 1 μm) is placed on the photograph, and then the area ratio of the second phase was determined by calculating the ratio of the number of grid points found on the second phase to the total number of the grid points. Since the area ratios at the L-section determined as described above had nearly the same values as that determined in a vertical cross section at right angle to the rolling direction, it was understood that there was no anisotropy in the area ratio, and the volume ratio of the second phase was defined as the area ratio in the L-section described above.

In the photograph of a microstructure, a dark colored area was recognized as a ferrite phase, an area in which lamellar carbide was observed in a ferrite phase was recognized as a pearlite phase, an area in which a dot sequence of carbide was observed in a ferrite phase was recognized as a bainite phase, and the other areas which were lighter than the ferrite phase was recognized as a martensite or retained austenite phase. The volume ratios of areas which were recognized as pearlite, bainite, martensite and retained austenite phases were determined and the volume fraction of the second phase was defined as the sum of those volume ratios. The volume fraction of a ferrite phase is obtained by subtracting the volume fraction of the second phase from 100.

The method for deriving the volume ratio of a retained austenite phase will be described hereafter.

The portion at a quarter of a thickness of a steel sheet was exposed by performing polishing and chemical polishing, then the integrated intensities of diffracted X-ray from {200}, {211} and {220}planes of a ferrite phase and {200}, {220} and {311}planes of an austenite phase of steel were observed at the portion by using X-ray diffractometer (RINT2200 manufactured by Rigaku Corporation) with Mo—Kα ray being used as a radiation source and with an acceleration voltage of 50 keV, and then the volume ratio of a retained austenite phase was derived from the observed values by using the equation described in the Non Patent Literature (Rigaku Electric Corporation: The Handbook of X-Ray Diffractometry (2000), p 26, 62-64). The volume ratio of a martensite phase was derived by subtracting that of a retained austenite phase observed by using X-ray diffractometry from the sum of those of martensite and retained austenite phases derived by performing the observation of a microstructure as describes above.

In the evaluation of the surface appearance quality of zinc coating, ○ denotes the case where surface appearance quality ideal to be used for an outer panel of an automobile without the deterioration of surface appearance such as bare spots, non-uniform alloying and other kinds of defects degrading surface appearance quality was achieved, ⊙ denotes the case where excellent surface appearance particularly without non-uniform color tone and the like was achieved, and Δ denotes the case where some of defects were found, x denotes the case where many defects were found.

These results are given in Table 3.

Table 3 indicates that the coated steel sheets of the examples of the present invention which satisfy the conditions on a chemical composition and manufacture according to the present invention have a TS of 440 MPa or more and less than 590 MPa and U.El of 24% or more, which means all these steel sheets have the values in the range according to the present invention. Moreover, these steel sheets have TS×U.El of 12000 MPa·% or more and TS×EL of 19000 MPa·% or more, which means these steel sheets have excellent properties. In addition, the surface appearance quality of any of these steel sheets was excellent.

The steel which satisfies the conditions on a chemical composition and manufacture according to the present invention have excellent stretch-flangeability (λ) of 80% or more in addition to the properties described above. Although the reason for this is not clear, it is thought to be because, in the process in which C is concentrated in an austenite phase when annealing is performed, Al is transferred to the surrounding ferrite phase and the ferrite phase is partially hardened by solid-solution strengthening, which results in a decrease in the difference in hardness between a ferrite phase and the surrounding martensite and retained austenite phases.

On the other hand, the steel sheets of treatment numbers 1, 2, 5, 6 and 36 manufactured by using steel A, B, E or K having the values for $Mn_{eq}+1.3[\% Al]$ of less than 2.8 had high volume fractions of pearlite and bainite phases and U.El of less than 24%. In addition, the steel sheets of treatment number 43, 44 and 46 manufactured by using steel O or Q having the values for $Mn_{eq}$ of more than 2.0 had a high TS of 590 MPa or more so as to have U.El of less than 24% despite having high TS×U.El. The steel sheet of treatment number 45 manufactured by using steel P having a C content of lower than the appropriate range had U.El of less than 24% due to lack of a retained austenite phase. The steel sheet of treatment number 48 and 49 manufactured by using steel S or T having a Cr content outside the appropriate range had U.El of less than 24%. The steel of treatment number 47 manufactured by using steel R having a high Si content had unsatisfied surface appearance quality due to bare spots despite having excellent uniform elongation. In addition, since the steel P described above had a high N content, scabs were found on the surface of the slab in the manufacturing process of the steel sheet of treatment number 45, and the flaw was retained as a surface defect, which resulted in the deterioration of surface appearance quality.

The steel sheets which had chemical compositions within the range of the present invention but did not satisfy the manufacturing conditions according to the present invention had some poor properties as described below. The steel sheet of treatment number 16 in which the slab was heated up to a temperature higher than the specified temperature had degraded surface appearance quality due to remaining secondary scale in some part of the surface thereof. In addition, the steel sheets of treatment numbers 16 and 33 in which the stopping temperature of primary cooling was lower than the critical primary cooling temperature $T_{crit}$ and the steel sheet of treatment number 14 in which the cooling rate of primary cooling was less than 5° C./s had U.El of less than 24% and exhibited YPEl due to increased volume fractions of a pearlite phase in the second phase and decreased volume fractions of a retained austenite phase, because these treatments did not satisfy the appropriate manufacturing conditions. The steel sheet of treatment number 28 in which the intermediate holding temperature was lower than 410° C. and the steel sheet of treatment number 25 in which the duration of intermediate holding was more than 180 seconds had U.El of less than 24%. In addition, the steel sheet of treatment number 15 in which the annealing temperature was 750° C. or lower had low U.El and exhibited YPEl. The steel sheet of treatment number 13 in which the coiling temperature was 500° C. or lower had U.El of less than 24% due to lack of stability of a retained austenite phase. The steel sheet of treatment number 51 in which the coiling temperature was low had small uniform elongation and exhibited YPEl due to the low volume fraction of a martensite phase. The steel sheet of treatment number 52 in which the holding time of intermediate holding was too long exhibited YPEl due to the absence of a martensite phase.

Table 1

TABLE 1

| Steel Code | Chemical Composition (mass %) | | | | | | | | | | | | | | Mn Equivalent $Mn_{eq}$ | $Mn_{eq}$ + 1.3Al |
|---|---|---|---|---|---|---|---|---|---|---|---|---|---|---|---|---|
| | C | Si | Mn | P | S | Al | Cr | B | N | Ti, Nb, V | Ni | Cu, Mo | Sb, Sn | Ca, REM | | |
| A | 0.111 | 0.01 | 0.50 | 0.01 | 0.009 | 1.00 | 0.31 | — | 0.0020 | — | — | — | — | — | 0.94 | 2.24 |
| B | 0.096 | 0.01 | 0.50 | 0.01 | 0.002 | 1.00 | 0.04 | 0.001 | 0.0019 | — | — | — | — | — | 0.74 | 2.04 |
| C | 0.110 | 0.01 | 0.50 | 0.01 | 0.002 | 1.50 | 0.30 | — | 0.0020 | Ti: 0.005 | — | — | — | — | 0.93 | 2.88 |
| D | 0.110 | 0.02 | 0.70 | 0.01 | 0.002 | 1.50 | 0.15 | — | 0.0029 | — | — | — | — | — | 0.94 | 2.89 |
| E | 0.124 | 0.01 | 1.00 | 0.01 | 0.004 | 0.95 | 0.29 | — | 0.0019 | — | — | — | — | — | 1.42 | 2.65 |
| F | 0.110 | 0.01 | 1.03 | 0.01 | 0.002 | 0.97 | 0.31 | 0.001 | 0.0020 | Ti: 0.005 | — | — | — | — | 1.62 | 2.88 |
| G | 0.100 | 0.02 | 1.01 | 0.03 | 0.002 | 1.02 | 0.30 | 0.001 | 0.0021 | — | — | Cu: 0.03 | — | — | 1.67 | 3.00 |
| H | 0.080 | 0.01 | 0.99 | 0.01 | 0.002 | 1.51 | 0.30 | — | 0.0025 | Nb: 0.010 | Ni: 0.2 | — | — | — | 1.42 | 3.38 |
| I | 0.113 | 0.01 | 1.00 | 0.01 | 0.002 | 1.50 | 0.30 | — | 0.0020 | — | — | — | — | — | 1.43 | 3.38 |
| J | 0.111 | 0.01 | 1.00 | 0.01 | 0.006 | 1.48 | 0.32 | 0.001 | 0.0022 | — | — | — | — | Ca: 0.006 | 1.61 | 3.53 |
| K | 0.110 | 0.01 | 1.30 | 0.01 | 0.003 | 0.70 | 0.29 | — | 0.0020 | — | — | — | — | — | 1.72 | 2.63 |
| L | 0.110 | 0.01 | 1.30 | 0.01 | 0.002 | 1.02 | 0.30 | — | 0.0030 | — | — | — | Sb: 0.1 | REM: 0.005 | 1.73 | 3.06 |
| M | 0.108 | 0.01 | 1.31 | 0.01 | 0.002 | 1.55 | 0.30 | — | 0.0020 | — | — | Mo: 0.03 | Sn: 0.2 | — | 1.74 | 3.76 |
| N | 0.160 | 0.01 | 1.20 | 0.02 | 0.008 | 1.33 | 0.26 | — | 0.0035 | Nb: 0.012 | — | Mo: 0.03 | — | — | 1.62 | 3.35 |
| O | 0.110 | 0.01 | 1.70 | 0.01 | 0.002 | 0.71 | 0.33 | — | 0.0048 | — | — | — | — | — | 2.17 | 3.09 |
| P | 0.050 | 0.01 | 1.05 | 0.01 | 0.004 | 1.34 | 0.30 | — | 0.0065 | — | — | — | — | — | 1.48 | 3.22 |
| Q | 0.210 | 0.01 | 2.34 | 0.01 | 0.003 | 0.55 | 0.01 | — | 0.0033 | — | — | — | — | — | 2.39 | 3.11 |
| R | 0.110 | 0.54 | 1.03 | 0.01 | 0.003 | 1.00 | 0.28 | — | 0.0045 | — | — | — | — | — | 1.43 | 2.73 |
| S | 0.109 | 0.01 | 1.03 | 0.01 | 0.002 | 1.48 | 0.01 | — | 0.0034 | — | — | — | — | — | 1.08 | 3.01 |
| T | 0.122 | 0.02 | 0.03 | 0.01 | 0.003 | 1.50 | 0.77 | — | 0.0025 | — | — | — | — | — | 1.07 | 3.02 |
| U | 0.077 | 0.14 | 1.41 | 0.01 | 0.003 | 1.20 | 0.27 | 0.001 | 0.0022 | Ti: 0.005 | — | — | — | — | 1.95 | 3.51 |

Table 2

TABLE 2

| Treatment Number | Steel Code | Hot Rolling Condition | | | Cold Rolling Ratio (%) | Annealing Condition | | Mean Primary Cooling Rate (° C./s) |
|---|---|---|---|---|---|---|---|---|
| | | Heating Temperature (° C.) | Finishing Temperature (° C.) | Coiling Temperature (° C.) | | Annealing Temperature (° C.) | Holding Time (s) | |
| 1 | A | 1200 | 950 | 580 | 80 | 850 | 120 | 15 |
| 2 | B | 1200 | 950 | 580 | 80 | 850 | 120 | 15 |
| 3 | C | 1200 | 950 | 580 | 80 | 850 | 120 | 20 |
| 4 | D | 1200 | 950 | 580 | 80 | 850 | 120 | 20 |
| 5 | E | 1200 | 950 | 580 | 80 | 850 | 120 | 15 |
| 6 | E | 1200 | 950 | 580 | 80 | 850 | 120 | 15 |
| 7 | F | 1200 | 950 | 580 | 80 | 850 | 120 | 5 |
| 8 | F | 1200 | 950 | 580 | 80 | 850 | 120 | 15 |

TABLE 2-continued

| | | | | | | | | |
|---|---|---|---|---|---|---|---|---|
| 9 | F | 1200 | 950 | 580 | 80 | 850 | 120 | 15 |
| 10 | F | 1200 | 950 | 580 | 80 | 900 | 120 | 30 |
| 11 | F | 1200 | 950 | 580 | 80 | 850 | 120 | 15 |
| 12 | F | 1200 | 950 | 580 | 80 | 850 | 120 | 15 |
| 13 | F | 1200 | 950 | <u>450</u> | 80 | 850 | 120 | 15 |
| 14 | F | 1200 | 950 | 580 | 80 | 850 | 120 | <u>1</u> |
| 15 | F | 1200 | 950 | 580 | 80 | 800 | <u>10</u> | 15 |
| 16 | F | 1200 | 900 | 650 | 80 | <u>730</u> | 120 | 15 |
| 17 | F | <u>1290</u> | <u>980</u> | 580 | 80 | 850 | 120 | 15 |
| 18 | G | 1200 | 950 | 580 | 80 | 850 | 120 | 15 |
| 19 | G | 1200 | 900 | 580 | 80 | 850 | 120 | 15 |
| 20 | H | 1200 | 950 | 580 | 80 | 850 | 120 | 15 |
| 21 | H | 1200 | 950 | 580 | 80 | 800 | 120 | 15 |
| 22 | I | 1200 | 950 | 580 | 80 | 900 | 120 | 15 |
| 23 | I | 1200 | 950 | 580 | 80 | 850 | 120 | 15 |
| 24 | I | 1200 | 950 | 650 | 80 | 850 | 40 | 8 |
| 25 | I | 1200 | 950 | 580 | 80 | 850 | 120 | 10 |
| 26 | I | 1200 | 950 | 580 | 80 | 850 | 120 | 15 |
| | | | | The Rest | | | | |
| 27 | I | 1200 | 950 | 580 | 80 | 850 | 120 | 15 |
| 28 | I | 1200 | 950 | 580 | 80 | 850 | 120 | 15 |
| 29 | I | 1200 | 950 | 580 | 80 | 850 | 120 | 15 |
| 30 | I | 1200 | 870 | 550 | 80 | 800 | 120 | 15 |
| 31 | I | 1200 | 870 | 550 | 80 | 850 | 120 | 15 |
| 32 | I | 1200 | 870 | 550 | 80 | 850 | 120 | 15 |
| 33 | I | 1200 | 870 | 550 | 80 | 850 | 120 | 15 |
| 34 | I | 1200 | 870 | 550 | 80 | 850 | 120 | 15 |
| 35 | J | 1200 | 950 | 580 | 80 | 850 | 120 | 15 |
| 36 | K | 1200 | 950 | 580 | 80 | 850 | 120 | 15 |
| 37 | L | 1200 | 900 | 580 | 80 | 850 | 120 | 15 |
| 38 | L | 1200 | 900 | 580 | 80 | 850 | 120 | 15 |
| 39 | L | 1200 | 900 | 580 | 80 | 850 | 120 | 15 |
| 40 | L | 1200 | 900 | 580 | 80 | 850 | 120 | 15 |
| 41 | M | 1200 | 900 | 580 | 80 | 850 | 120 | 15 |
| 42 | N | 1150 | 870 | 580 | 80 | 780 | 120 | 15 |
| 43 | O | 1200 | 900 | 580 | 80 | 850 | 120 | 15 |
| 44 | O | 1200 | 900 | 580 | 80 | 850 | 120 | 15 |
| 45 | P | 1200 | 900 | 580 | 80 | 900 | 120 | 15 |
| 46 | Q | 1200 | 870 | 580 | 80 | 850 | 120 | 15 |
| 47 | R | 1200 | 950 | 580 | 80 | 850 | 120 | 15 |
| 48 | S | 1200 | 950 | 580 | 80 | 850 | 120 | 15 |
| 49 | T | 1200 | 950 | 580 | 80 | 850 | 120 | 15 |
| 50 | U | 1200 | 900 | 550 | 80 | 800 | 120 | 10 |
| 51 | I | 1200 | 900 | 400 | 80 | 770 | 60 | 15 |
| 52 | I | 1200 | 950 | 580 | 80 | 800 | 120 | 8 |

| | Annealing Condition | | | | | |
|---|---|---|---|---|---|---|
| Treatment Number | Critical Priamary Cooling Temperature $T_{crit}$(° C.) | Stopping Temperature of Primary Cooling (° C.) | Mean Secondary Cooling Rate (° C./s) | Intermediate Holding Temperature (° C.) | Intermediate Holding Time (s) | Alloying |
| 1 | 677 | 800 | 25 | 470 | 40 | Undone |
| 2 | 710 | 720 | 25 | 470 | 40 | Undone |
| 3 | 667 | 700 | 25 | 470 | 40 | Undone |
| 4 | 666 | 700 | 25 | 470 | 40 | Done |
| 5 | 599 | 680 | 25 | 470 | 40 | Done |
| 6 | 599 | 680 | 25 | 470 | 80 | Done |
| 7 | 590 | 650 | 25 | 470 | 20 | Done |
| 8 | 565 | 650 | 25 | 470 | 20 | Undone |
| 9 | 565 | 650 | 25 | 470 | 40 | Undone |
| 10 | 527 | 620 | 25 | 470 | 40 | Done |
| 11 | 565 | 600 | 25 | 470 | 20 | Done |
| 12 | 565 | 600 | 25 | 470 | 40 | Done |
| 13 | 565 | 650 | 25 | 470 | 80 | Done |
| 14 | 600 | 630 | 25 | 470 | 150 | Done |
| 15 | 565 | 650 | 25 | 470 | 40 | Undone |
| 16 | 565 | 650 | 25 | 470 | 20 | Done |
| 17 | 565 | <u>550</u> | 25 | 470 | 40 | Done |
| 18 | 557 | 650 | 25 | 470 | 20 | Done |
| 19 | 557 | 650 | 25 | 470 | 40 | Done |
| 20 | 598 | 700 | 25 | 470 | 40 | Done |
| 21 | 598 | 700 | 25 | 470 | 40 | Done |
| 22 | 597 | 700 | 25 | 470 | 40 | Done |
| 23 | 597 | 700 | 25 | 500 | 40 | Done |
| 24 | 614 | 680 | 25 | 470 | 45 | Undone |
| 25 | 609 | 680 | 25 | 470 | 80 | Undone |

TABLE 2-continued

| | | | | | | |
|---|---|---|---|---|---|---|
| 26 | 597 | 680 | 25 | 470 | <u>200</u> | Undone |
| | | | The Rest | | | |
| 27 | 597 | 700 | 25 | 440 | 40 | Done |
| 28 | 597 | 700 | 25 | 410 | 40 | Done |
| 29 | 597 | 800 | 25 | <u>400</u> | 80 | Done |
| 30 | 597 | 700 | 25 | 470 | 40 | Done |
| 31 | 597 | 800 | 25 | 470 | 40 | Done |
| 32 | 597 | 650 | 25 | 470 | 40 | Done |
| 33 | 597 | 600 | 25 | 470 | 40 | Done |
| 34 | 597 | <u>550</u> | 25 | 470 | 40 | Done |
| 35 | 568 | 700 | 25 | 470 | 40 | Done |
| 36 | 549 | 650 | 25 | 470 | 40 | Done |
| 37 | 547 | 700 | 25 | 470 | 40 | Done |
| 38 | 547 | 650 | 25 | 470 | 40 | Done |
| 39 | 547 | 600 | 25 | 470 | 40 | Done |
| 40 | 547 | 550 | 25 | 470 | 40 | Done |
| 41 | 545 | 650 | 25 | 470 | 40 | Undone |
| 42 | 566 | 600 | 17 | 470 | 40 | Undone |
| 43 | 475 | 700 | 25 | 470 | 40 | Done |
| 44 | 475 | 550 | 25 | 470 | 40 | Done |
| 45 | 588 | 700 | 25 | 470 | 20 | Done |
| 46 | 438 | 550 | 25 | 470 | 40 | Done |
| 47 | 596 | 700 | 25 | 470 | 40 | Done |
| 48 | 654 | 700 | 25 | 470 | 40 | Done |
| 49 | 656 | 700 | 25 | 470 | 40 | Done |
| 50 | 523 | 650 | 25 | 470 | 40 | Done |
| 51 | 597 | 650 | 25 | 470 | 40 | Done |
| 52 | 614 | 630 | 20 | 480 | <u>220</u> | Done |

Table 3

TABLE 3

| | | Microstructure(vol. %)* | | | Mechanical Property | | | |
|---|---|---|---|---|---|---|---|---|
| | | Volume | | | | | | |
| Treatment Number | Steel Code | Fraction of Scond Phase | γ Volume Fraction | M Volume Fraction | P + B Sum of Volume Faction | Tensile Strength (MPa) | Yield Point Elongation YPEl (%) | Uniform Elongation U.El (%) | Total Elongation El (%) |
| 1 | A | 15 | <u>2</u> | <u>1</u> | <u>12</u> | 499 | <u>2.0</u> | <u>18</u> | 32 |
| 2 | B | 14 | 4 | <u>1</u> | <u>9</u> | 480 | <u>1.5</u> | <u>21</u> | 34 |
| 3 | C | 8 | 3 | 3 | 2 | 501 | 0.2 | 24 | 38 |
| 4 | D | 8 | 3 | 3 | 2 | 506 | 0.1 | 24 | 38 |
| 5 | E | 12 | 3 | <u>2</u> | <u>7</u> | 541 | 0.0 | <u>19</u> | 33 |
| 6 | E | 13 | 3 | <u>2</u> | <u>8</u> | 530 | <u>0.6</u> | <u>20</u> | 34 |
| 7 | F | 10 | 4 | 4 | 2 | 541 | 0.0 | 24 | 37 |
| 8 | F | 10 | 4 | 4 | 2 | 539 | 0.0 | 24 | 37 |
| 9 | F | 10 | 3 | 4 | 3 | 525 | 0.0 | 24 | 38 |
| 10 | F | 11 | 3 | 5 | 3 | 528 | 0.0 | 25 | 37 |
| 11 | F | 8 | 4 | 4 | 0 | 515 | 0.0 | 24 | 37 |
| 12 | F | 8 | 3 | 3 | 2 | 515 | 0.0 | 24 | 37 |
| 13 | F | 9 | 3 | <u>2</u> | <u>4</u> | 518 | <u>0.7</u> | <u>23</u> | 36 |
| 14 | F | 8 | <u>2</u> | <u>1</u> | <u>5</u> | 510 | <u>1.0</u> | <u>21</u> | 36 |
| 15 | F | 7 | <u>2</u> | <u>1</u> | <u>4</u> | 501 | <u>0.4</u> | <u>22</u> | 36 |
| 16 | F | 5 | <u>2</u> | <u>2</u> | 1 | 489 | <u>0.8</u> | <u>20</u> | 37 |
| 17 | F | 8 | <u>0</u> | 3 | <u>5</u> | 518 | <u>1.6</u> | <u>22</u> | 33 |
| 18 | G | 10 | 4 | 4 | 2 | 560 | 0.0 | 25 | 37 |
| 19 | G | 10 | 4 | 3 | 3 | 545 | 0.0 | 24 | 37 |
| 20 | H | 8 | 4 | 4 | 0 | 500 | 0.0 | 27 | 38 |
| 21 | H | 8 | 4 | 4 | 0 | 498 | 0.0 | 28 | 39 |
| 22 | I | 12 | 5 | 7 | 0 | 539 | 0.0 | 27 | 39 |
| 23 | I | 14 | 4 | 10 | 0 | 566 | 0.0 | 25 | 40 |
| 24 | I | 12 | 6 | 6 | 0 | 537 | 0.0 | 27 | 40 |
| 25 | I | 11 | 5 | 5 | 1 | 536 | 0.0 | 27 | 40 |
| 26 | I | 11 | 4 | <u>2</u> | <u>5</u> | 536 | <u>0.6</u> | <u>23</u> | 38 |
| | | | | The Rest | | | | | |
| 27 | I | 13 | 6 | 6 | 1 | 553 | 0.0 | 27 | 40 |
| 28 | I | 14 | 6 | 6 | 2 | 570 | 0.0 | 25 | 38 |
| 29 | I | 13 | <u>2</u> | 3 | <u>8</u> | 554 | <u>1.6</u> | <u>22</u> | 33 |
| 30 | I | 13 | 6 | 7 | 0 | 540 | 0.0 | 28 | 40 |
| 31 | I | 11 | 5 | 6 | 0 | 562 | 0.0 | 27 | 37 |
| 32 | I | 10 | 6 | 3 | 1 | 547 | 0.0 | 28 | 38 |
| 33 | I | 9 | 4 | 3 | 2 | 542 | 0.0 | <u>24</u> | 36 |

TABLE 3-continued

| | | | | | | | | | |
|---|---|---|---|---|---|---|---|---|---|
| 34 | I | 8 | <u>2</u> | 3 | <u>3</u> | 545 | <u>0.8</u> | <u>22</u> | 31 |
| 35 | J | 12 | 5 | 7 | 0 | 542 | 0.0 | 27 | 40 |
| 36 | K | 12 | <u>2</u> | <u>3</u> | <u>7</u> | 546 | 0.0 | <u>21</u> | 34 |
| 37 | L | 12 | 4 | 5 | 3 | 553 | 0.0 | 26 | 37 |
| 38 | L | 13 | 5 | 4 | 4 | 549 | 0.0 | 26 | 37 |
| 39 | L | 12 | 6 | 4 | 2 | 549 | 0.0 | 24 | 37 |
| 40 | L | 15 | 6 | 6 | 3 | 549 | 0.0 | 25 | 37 |
| 41 | M | 13 | 7 | 4 | 2 | 559 | 0.0 | 28 | 40 |
| 42 | N | 15 | 5 | 7 | 3 | 576 | 0.0 | 24 | 36 |
| 43 | O | <u>17</u> | 7 | 9 | 1 | <u>605</u> | 0.0 | <u>23</u> | 34 |
| 44 | O | <u>17</u> | 7 | 9 | 1 | <u>608</u> | 0.0 | <u>23</u> | 34 |
| 45 | P | 5 | <u>2</u> | 3 | 0 | 467 | 0.0 | <u>21</u> | 37 |
| 46 | Q | <u>21</u> | 8 | 11 | 2 | <u>689</u> | 0.0 | <u>19</u> | 29 |
| 47 | R | 11 | 6 | 5 | 0 | 574 | 0.0 | 25 | 40 |
| 48 | S | 7 | 3 | <u>2</u> | 2 | 521 | 0.0 | <u>22</u> | 34 |
| 49 | T | 6 | <u>1</u> | 4 | 1 | 479 | 0.0 | <u>22</u> | 40 |
| 50 | U | 9 | 5 | 4 | 0 | 518 | 0.0 | 26 | 41 |
| 51 | I | 9 | 3 | 2 | <u>4</u> | 521 | <u>0.6</u> | <u>22</u> | 35 |
| 52 | I | 5 | 5 | <u>0</u> | 0 | 470 | <u>1.1</u> | 27 | 42 |

| | Mechanical Property | | | | |
|---|---|---|---|---|---|
| Treatment Number | TS × U.El (MPa %) | TS × El (MPa %) | Hole Expansion Ratio λ (%) | Surface Appearance Quality | |
| 1 | <u>8982</u> | <u>15968</u> | 76 | ☉ | ComparativeExample |
| 2 | <u>10080</u> | <u>16320</u> | 79 | ☉ | ComparativeExample |
| 3 | 12024 | 19038 | 102 | ☉ | Example |
| 4 | 12144 | 19228 | 110 | ☉ | Example |
| 5 | <u>10279</u> | <u>17853</u> | 74 | ☉ | ComparativeExample |
| 6 | <u>10600</u> | <u>18020</u> | 70 | ☉ | ComparativeExample |
| 7 | 12984 | 20017 | 108 | ☉ | Example |
| 8 | 12936 | 19943 | 103 | ☉ | Example |
| 9 | 12600 | 19950 | 100 | ☉ | Example |
| 10 | 13200 | 19536 | 99 | ☉ | Example |
| 11 | 12360 | 19055 | 106 | ☉ | Example |
| 12 | 12360 | 19055 | 101 | ☉ | Example |
| 13 | <u>11914</u> | <u>18648</u> | 76 | ◯ | ComparativeExample |
| 14 | <u>10710</u> | <u>18360</u> | 72 | ☉ | ComparativeExample |
| 15 | <u>11022</u> | <u>18036</u> | 79 | ☉ | ComparativeExample |
| 16 | <u>9780</u> | <u>18093</u> | 102 | ☉ | ComparativeExample |
| 17 | <u>11396</u> | <u>17094</u> | 72 | Δ | ComparativeExample |
| 18 | 14000 | 20720 | 103 | ☉ | Example |
| 19 | 13080 | 20165 | 102 | ☉ | Example |
| 20 | 13500 | 19000 | 102 | ☉ | Example |
| 21 | 13944 | 19422 | 102 | ☉ | Example |
| 22 | 14553 | 21021 | 107 | ◯ | Example |
| 23 | 14150 | 22640 | 101 | ☉ | Example |
| 24 | 14499 | 21480 | 101 | ☉ | Example |
| 25 | 14472 | 21440 | 105 | ☉ | Example |
| 26 | 12328 | 20368 | 70 | ◯ | ComparativeExample |
| | | | The Rest | | |
| 27 | 14931 | 22120 | 110 | ☉ | Example |
| 28 | 14250 | 21660 | 106 | ☉ | Example |
| 29 | <u>12188</u> | <u>18282</u> | 76 | ☉ | ComparativeExample |
| 30 | 15120 | 21600 | 106 | ☉ | Example |
| 31 | 15174 | 20794 | 105 | ☉ | Example |
| 32 | 15316 | 20786 | 100 | ☉ | Example |
| 33 | 13008 | 19512 | 107 | ☉ | Example |
| 34 | <u>11990</u> | <u>16895</u> | 79 | ☉ | ComparativeExample |
| 35 | 14634 | 21680 | 108 | ☉ | Example |
| 36 | <u>11466</u> | <u>18564</u> | 77 | ☉ | ComparativeExample |
| 37 | 14378 | 20461 | 99 | ☉ | Example |
| 38 | 14274 | 20313 | 95 | ☉ | Example |
| 39 | 13176 | 20313 | 101 | ☉ | Example |
| 40 | 13725 | 20313 | 103 | ☉ | Example |
| 41 | 15652 | 22360 | 98 | ☉ | Example |
| 42 | 13824 | 20736 | 100 | ☉ | Example |
| 43 | 13915 | 20570 | 67 | ☉ | ComparativeExample |
| 44 | 13984 | 20672 | 62 | ☉ | ComparativeExample |
| 45 | <u>9807</u> | <u>17279</u> | 90 | X | ComparativeExample |

TABLE 3-continued

| | | | | | |
|---|---|---|---|---|---|
| 46 | 13091 | 19981 | 54 | ⊙ | ComparativeExample |
| 47 | 14350 | 22960 | 94 | X | ComparativeExample |
| 48 | 11462 | 17714 | 96 | ⊙ | ComparativeExample |
| 49 | 10538 | 19160 | 71 | Δ | ComparativeExample |
| 50 | 13468 | 21238 | 105 | ○ | Example |
| 51 | 11462 | 18235 | 75 | Δ | ComparativeExample |
| 52 | 12690 | 19740 | 95 | ⊙ | ComparativeExample |

*γ: Austenite, M: Martensite, P: Pearlite, B: Bainite

The high strength galvanized steel sheet according to the present invention can be used in the industrial fields such as automobile and domestic electric appliances industries and, in particular, effectively applied to the parts of which strength, formability and surface appearance quality are required.

The invention claimed is:

1. A high strength galvanized steel sheet having excellent uniform elongation and zinc coatability, which comprises steel having a chemical composition containing, by mass %, C: 0.06% or more and 0.20% or less, Si: less than 0.50%, Mn: 0.5% or more and 1.87% or less, P: 0.05% or less, S: 0.02% or less, Al: 0.60% or more and 2.00% or less, N: less than 0.004%, Cr: 0.10% or more and 0.40% or less, B: 0.003% or less (including 0%) and the balance being Fe and inevitable impurities, where $Mn_{eq}$ defined below satisfies the relationships $0.8 \leq Mn_{eq} \leq 2.0$ and $Mn_{eq}+1.3[\% Al] \geq 2.8$, and having a microstructure containing a ferrite phase as a parent phase and a second phase whose volume fraction is 15% or less, the second phase having a martensite phase whose volume fraction is 3% or more, a retained austenite phase whose volume fraction is 3% or more and a sum of the volume fractions of a pearlite phase and a bainite phase which is equal to or less than the volume fraction of the martensite phase and which is equal to or less than the volume fraction of the retained austenite phase, and a galvanizing layer on the surface of the steel sheet, the steel sheet having a tensile strength of 440 MPa or more and less than 590 MPa and a uniform elongation of 24% or more:

$$Mn_{eq}=[\% Mn]+1.3[\% Cr]+4[\% P]+150[\% B],$$

where [% Mn], [% Cr], [% P] and [% B] respectively denote the contents by mass % of Mn, Cr, P and B in the chemical composition of the steel, and where [% Al] described above also denotes the content by mass % of Al in the chemical composition of the steel.

2. The high strength galvanized steel sheet having excellent uniform elongation and zinc coatability according to claim 1, the Si content of the steel being less than 0.05%.

3. The high strength galvanized steel sheet having excellent uniform elongation and zinc coatability according to claim 1, the steel having a chemical composition further containing, by mass %, one or more of Ti: 0.02% or less, V: 0.02% or less, Ni: 0.2% or less, Cu: less than 0.1%, Nb: 0.02% or less, Mo: less than 0.1%, Sn: 0.2% or less, Sb: 0.2% or less, Ca: 0.01% or less, and REM: 0.01% or less.

4. The high strength galvanized steel sheet having excellent uniform elongation and zinc coatability according to claim 1, the steel sheet having a tensile strength×elongation balance of 19000 MPa·% or more and a tensile strength×uniform elongation balance of 12000 MPa·% or more.

* * * * *